US007850012B2

(12) United States Patent
Gibson et al.

(10) Patent No.: US 7,850,012 B2
(45) Date of Patent: Dec. 14, 2010

(54) SILANE-TREATED SILICA FILTER MEDIA

(75) Inventors: Gary L. Gibson, Midland, MI (US); Keith Hayes, Midland, MI (US); Meng H. Heng, Belmont, CA (US); Csilla Kollar, Midland, MI (US); Thomas H. Lane, Midland, MI (US); Anthony Revis, Freeland, MI (US); Landon M. Steele, Redwood City, CA (US)

(73) Assignees: Dow Corning Corporation, Midland, MI (US); Danisco US Inc., Palo Alto, CA (US)

( * ) Notice: Subject to any disclaimer, the term of this patent is extended or adjusted under 35 U.S.C. 154(b) by 91 days.

(21) Appl. No.: 12/101,743

(22) Filed: Apr. 11, 2008

(65) Prior Publication Data

US 2008/0185333 A1 Aug. 7, 2008

Related U.S. Application Data

(63) Continuation of application No. 11/828,275, filed on Jul. 25, 2007, now Pat. No. 7,374,684, which is a continuation of application No. 10/830,935, filed on Apr. 23, 2004, now Pat. No. 7,264,728, which is a continuation-in-part of application No. 10/677,404, filed on Oct. 1, 2003, now abandoned.

(60) Provisional application No. 60/415,474, filed on Oct. 1, 2002.

(51) Int. Cl.
*B01D 39/00* (2006.01)

(52) U.S. Cl. .............. 210/502.1; 252/184; 423/335; 502/401; 502/407; 210/506

(58) Field of Classification Search .......... 210/496, 210/502.1, 506, 510.1, 503–505, 679–681, 210/198.2, 638, 639, 656; 106/2, 287.11, 106/287.12; 252/175, 184; 423/335, 336; 428/312.6, 331, 403, 404; 502/400, 407, 502/401–406; 96/108, 153; 55/522, 524
See application file for complete search history.

(56) References Cited

U.S. PATENT DOCUMENTS 3,680,699 A 8/1972 MacPherson (Continued)

FOREIGN PATENT DOCUMENTS

EP 0 183 139 B1 11/1985

(Continued)

OTHER PUBLICATIONS

Roy, et al., "Preparation of Ion-Exchange Silica and Effect of pH on Protein Binding of Ion-Exchange Silica", *J. of Chromatographic Science*, 22: 84-6 (1984).

(Continued)

*Primary Examiner*—Joseph W Drodge
(74) *Attorney, Agent, or Firm*—Howrey LLP; Viola T. Kung

(57) ABSTRACT

The present invention provides methods for separating one or more components of interest from a sample containing particulates and soluble materials. The method comprises the steps of: (a) filtering a sample through silica filter media whose surface silanol groups have reacted with one or more silanes, and (b) simultaneously capturing particulates and binding a soluble component to the silica filter media. The bound soluble component of interest is subsequently eluted from the silica filter media. In one embodiment of the invention, unwanted soluble materials are captured by the treated silica filter media and desired component of interest is recovered from the flow-through. In another embodiment, different components of interest are recovered from both the eluate and the flow-through. Preferred treated silica filter media are silane-treated rice hull ash or diatomaceous earth with functional quarternary ammonium group or functional sulphonate group. The present invention also provides silane-treated silica filter media.

18 Claims, 12 Drawing Sheets

U.S. PATENT DOCUMENTS

| | | | |
|---|---|---|---|
| 3,684,467 A * | 8/1972 | Smucker et al. .............. 65/451 |
| 3,810,843 A | 5/1974 | Slusarczuk et al. |
| 3,865,728 A | 2/1975 | Abbott et al. |
| 3,956,179 A * | 5/1976 | Sebestian et al. ............ 502/158 |
| 4,187,120 A | 2/1980 | Kunin et al. |
| 4,238,334 A | 12/1980 | Halbfoster |
| 4,290,892 A | 9/1981 | Abbott |
| 4,298,500 A | 11/1981 | Abbott |
| 4,322,542 A | 3/1982 | Abbott |
| 4,379,931 A | 4/1983 | Plueddemann |
| 4,473,474 A | 9/1984 | Ostreicher et al. |
| 4,515,821 A | 5/1985 | Armstead et al. |
| 4,571,389 A | 2/1986 | Goodwin et al. |
| 4,594,158 A | 6/1986 | Chong et al. |
| 4,619,911 A | 10/1986 | Goodwin et al. |
| 4,645,567 A | 2/1987 | Hou et al. |
| 4,645,605 A | 2/1987 | Durham |
| 4,682,992 A | 7/1987 | Fuchs |
| 4,724,207 A * | 2/1988 | Hou et al. .................... 435/180 |
| 4,734,208 A | 3/1988 | Pall et al. |
| 4,824,578 A | 4/1989 | Schneider et al. |
| 5,013,459 A | 5/1991 | Gettings et al. |
| 5,019,173 A | 5/1991 | Gettings et al. |
| 5,073,195 A * | 12/1991 | Cuthbert et al. ............... 106/2 |
| 5,073,281 A | 12/1991 | Paules et al. |
| 5,240,602 A | 8/1993 | Hammen |
| 5,277,813 A | 1/1994 | Feibush et al. |
| 5,360,633 A | 11/1994 | Dean |
| 5,413,059 A | 5/1995 | Schips |
| 5,628,910 A | 5/1997 | Michos |
| 5,776,353 A | 7/1998 | Palm et al. |
| 5,856,429 A | 1/1999 | Michos |
| 5,858,911 A | 1/1999 | Wellen et al. |
| 5,888,397 A | 3/1999 | Rogers et al. |
| 5,942,115 A | 8/1999 | Reiber |
| 6,001,406 A | 12/1999 | Katzke et al. |
| 6,071,410 A | 6/2000 | Nau et al. |
| 6,310,110 B1 * | 10/2001 | Markowitz et al. ............ 521/99 |
| 6,375,735 B1 | 4/2002 | Stephens et al. |
| 6,465,387 B1 * | 10/2002 | Pinnavaia et al. ........... 502/158 |
| 6,482,324 B2 | 11/2002 | Kirkland et al. |
| 6,521,290 B1 | 2/2003 | Kudo et al. |
| 6,524,489 B1 * | 2/2003 | Palm et al. .................. 210/777 |
| 6,649,083 B1 * | 11/2003 | Pinnavaia et al. ........... 252/179 |
| 6,713,543 B2 | 3/2004 | El-Shoubary et al. |
| 6,749,813 B1 | 6/2004 | David et al. |
| 6,833,075 B2 * | 12/2004 | Hughes ..................... 210/679 |
| 7,264,728 B2 * | 9/2007 | Gibson et al. ............... 210/638 |
| 7,374,684 B2 * | 5/2008 | Gibson et al. ............... 210/638 |
| 2002/0070168 A1 | 6/2002 | Jiang et al. |
| 2006/0289349 A1 * | 12/2006 | Hughes .................. 210/500.1 |

FOREIGN PATENT DOCUMENTS

| | | |
|---|---|---|
| EP | 0 798 003 | 3/1997 |
| EP | 0 806 474 A1 | 5/1997 |
| EP | 0814156 A | 12/1997 |
| JP | 5212241 | 8/1993 |
| JP | 07246306 A | 9/1995 |
| JP | 8119619 | 5/1996 |
| JP | 10036705 | 2/1998 |
| JP | 22146232 | 5/2002 |
| WO | WO 97/43401 | 3/1997 |
| WO | WO 00/48706 | 2/2000 |
| WO | WO 00/48706 A | 8/2000 |
| WO | WO 01/12296 | 2/2001 |
| WO | WO 02/38758 A | 5/2002 |
| WO | WO 02/083270 | 10/2002 |

OTHER PUBLICATIONS

Snyder, et al., "Preparation and Properties of Bonded-Phase Peckings", *Introduction to Modern Liquid Chromatography*, $2^{nd}$ edition, pp. 272-80 (1979).

Buszewski et al, "Survey and Trends in the Preparation of Chemically Bound Silica Phases for Liquid Chromatographic Analysis," Journal of High Resolution Chromatography, vol. 21, May 1988, pp. 267-281, downloaded Nov. 9, 2005.

International Search Report for PCT/US03/31629, mailed Apr. 6, 2004.

Supplementary European Search Report for EP03776237, mailed Aug. 28, 2009.

* cited by examiner 4-12% SDS-PAGE Gel (Reducing MES)

Lane #1: Feed
Lane #2: MW Marker**
Lane #3: Sample 11 FT
Lane #4: Sample 11 Wash
Lane #5: Sample 11 Eluate
Lane #6: Sample 12 FT
Lane #7: Sample 8 Wash
Lane #8: Sample 8 Eluate

** See Figure 1A for the corresponding molecular weight for each band

Lane #1: Feed
Lane #2: Sample 14 FT
Lane #3: Sample 14 Wash
Lane #4: Sample 14 Eluate #1
Lane #5: Sample 14 Eluate #2
Lane #6: MW Marker**

** See Figure 1A for corresponding MW size for each band

Lane #1: MW Marker**
Lane #2: Feed
Lane #3: Sample 13 FT
Lane #4: Sample 13 Wash
Lane #5: Sample 13 Eluate #1
Lane #6: Sample 13 Eluate #2

** See Figure 1A for corresponding MW size for each band

FIG. 3C

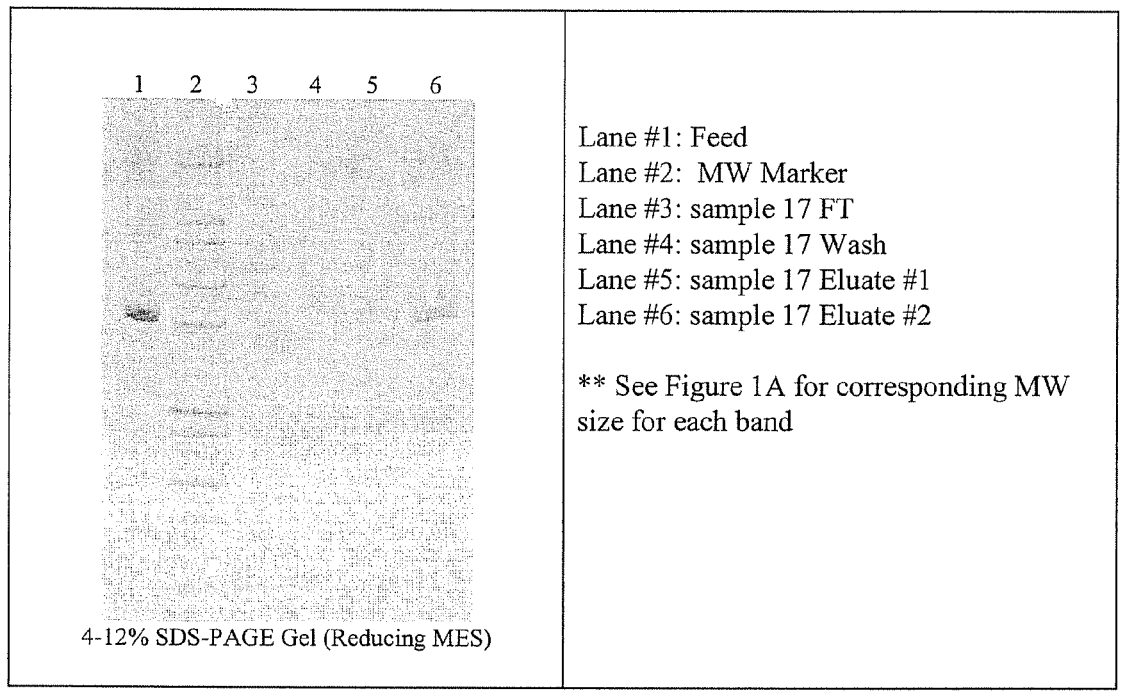

Lane #1: Feed
Lane #2: MW Marker
Lane #3: sample 17 FT
Lane #4: sample 17 Wash
Lane #5: sample 17 Eluate #1
Lane #6: sample 17 Eluate #2

** See Figure 1A for corresponding MW size for each band 4-12% SDS-PAGE Gel (Reducing MES)

FIG. 3D

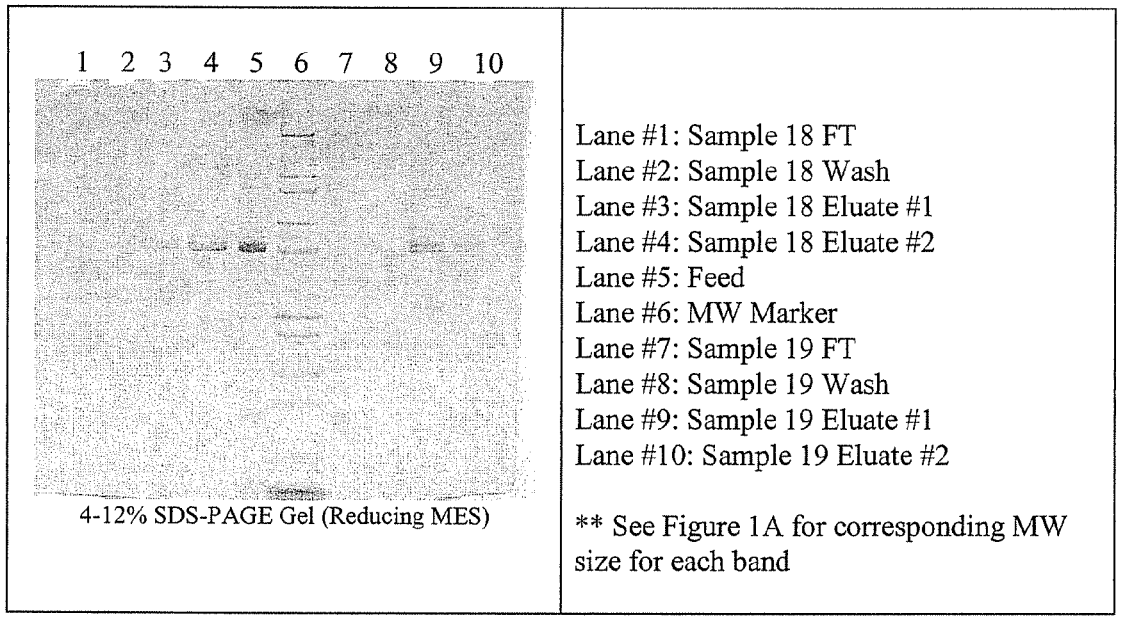

Lane #1: Sample 18 FT
Lane #2: Sample 18 Wash
Lane #3: Sample 18 Eluate #1
Lane #4: Sample 18 Eluate #2
Lane #5: Feed
Lane #6: MW Marker
Lane #7: Sample 19 FT
Lane #8: Sample 19 Wash
Lane #9: Sample 19 Eluate #1
Lane #10: Sample 19 Eluate #2

** See Figure 1A for corresponding MW size for each band 4-12% SDS-PAGE Gel (Reducing MES)

FIG. 4A

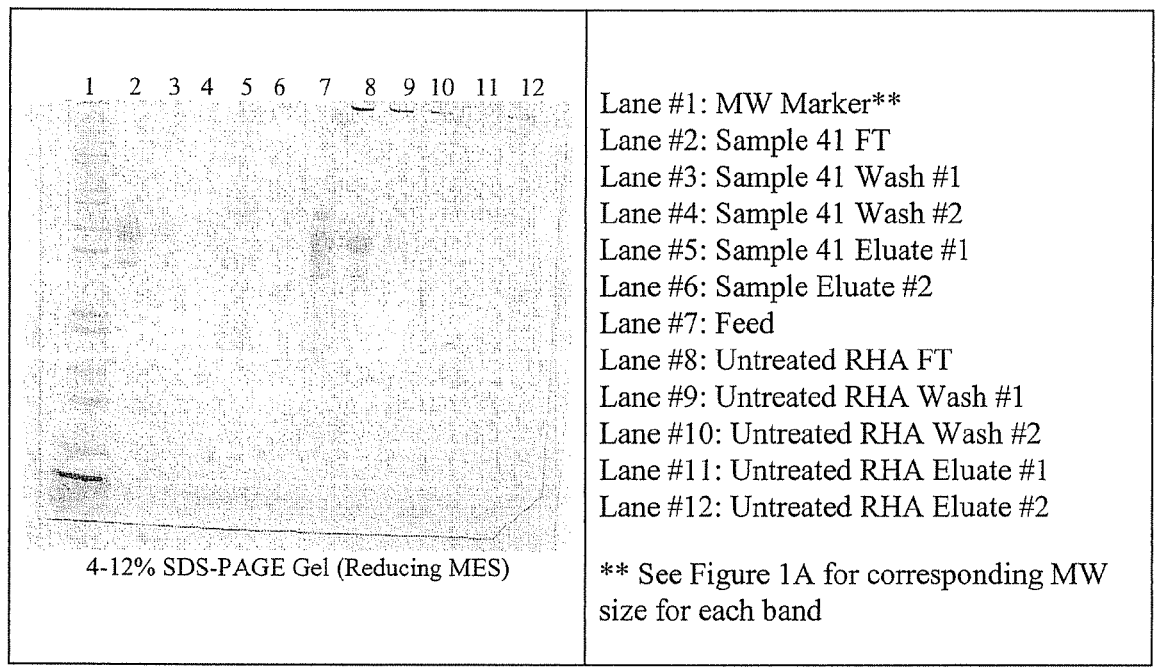

4-12% SDS-PAGE Gel (Reducing MES)

Lane #1: MW Marker**
Lane #2: Sample 41 FT
Lane #3: Sample 41 Wash #1
Lane #4: Sample 41 Wash #2
Lane #5: Sample 41 Eluate #1
Lane #6: Sample Eluate #2
Lane #7: Feed
Lane #8: Untreated RHA FT
Lane #9: Untreated RHA Wash #1
Lane #10: Untreated RHA Wash #2
Lane #11: Untreated RHA Eluate #1
Lane #12: Untreated RHA Eluate #2

** See Figure 1A for corresponding MW size for each band

FIG. 4B

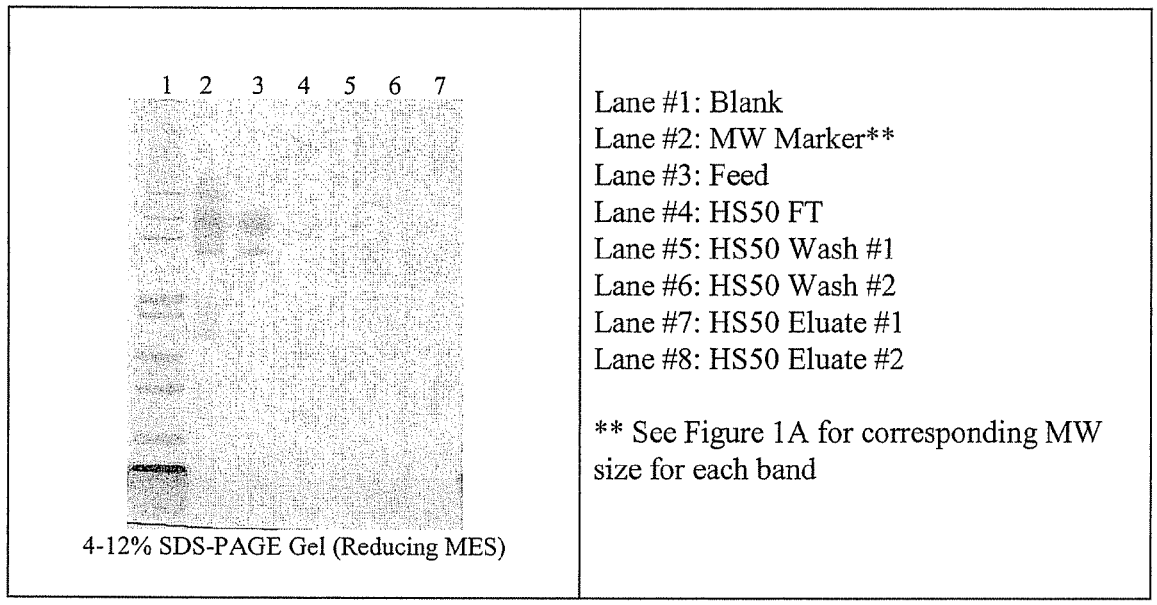

4-12% SDS-PAGE Gel (Reducing MES)

Lane #1: Blank
Lane #2: MW Marker**
Lane #3: Feed
Lane #4: HS50 FT
Lane #5: HS50 Wash #1
Lane #6: HS50 Wash #2
Lane #7: HS50 Eluate #1
Lane #8: HS50 Eluate #2

** See Figure 1A for corresponding MW size for each band

FIG. 5A

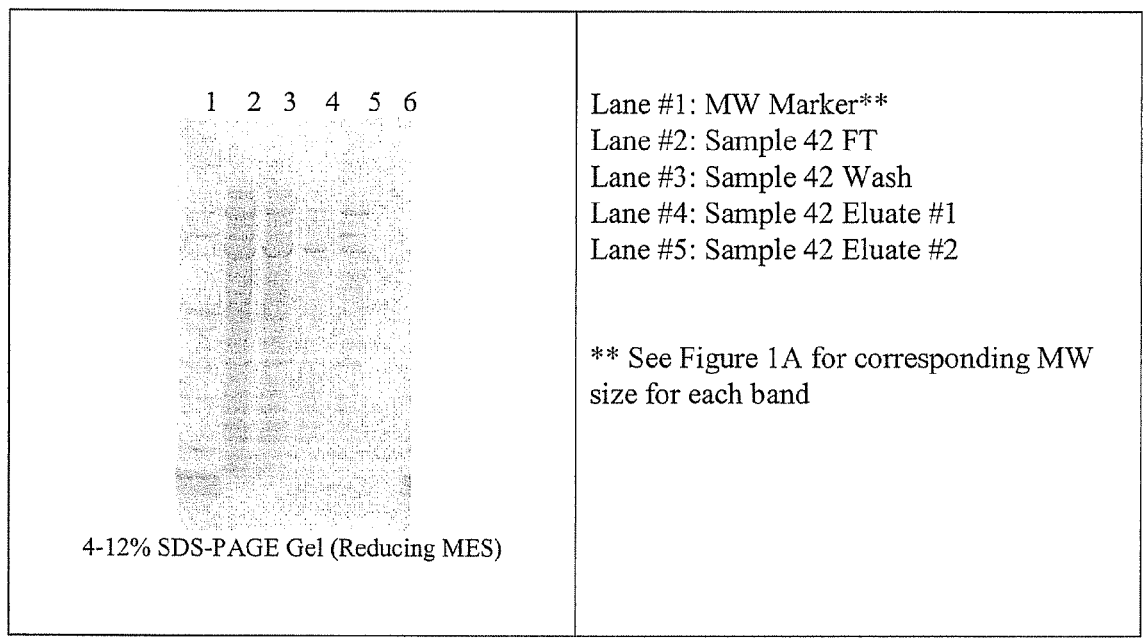

4-12% SDS-PAGE Gel (Reducing MES)

Lane #1: MW Marker**
Lane #2: Sample 42 FT
Lane #3: Sample 42 Wash
Lane #4: Sample 42 Eluate #1
Lane #5: Sample 42 Eluate #2

** See Figure 1A for corresponding MW size for each band

FIG. 5B

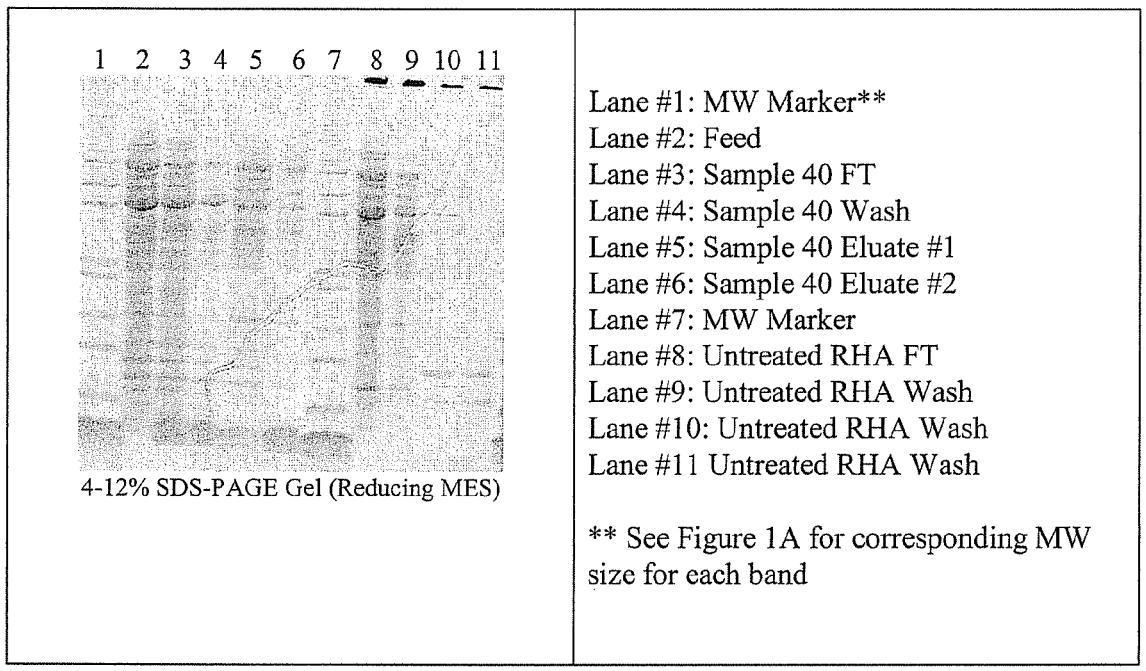

4-12% SDS-PAGE Gel (Reducing MES)

Lane #1: MW Marker**
Lane #2: Feed
Lane #3: Sample 40 FT
Lane #4: Sample 40 Wash
Lane #5: Sample 40 Eluate #1
Lane #6: Sample 40 Eluate #2
Lane #7: MW Marker
Lane #8: Untreated RHA FT
Lane #9: Untreated RHA Wash
Lane #10: Untreated RHA Wash
Lane #11 Untreated RHA Wash

** See Figure 1A for corresponding MW size for each band

FIG. 5C

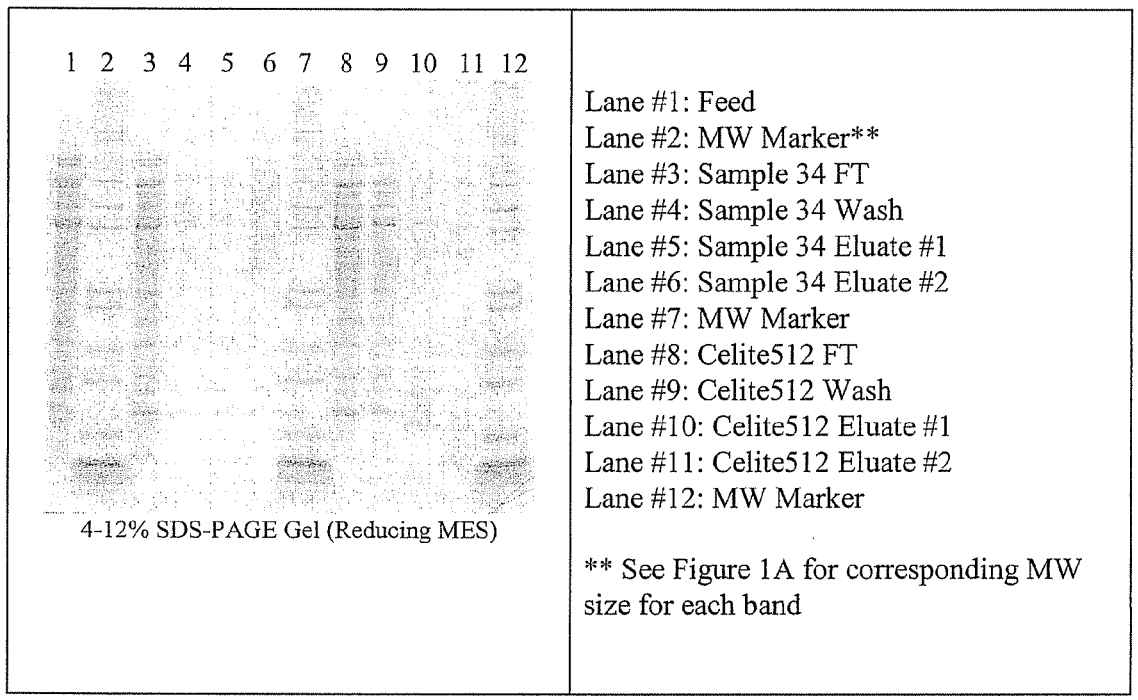

Lane #1: Feed
Lane #2: MW Marker**
Lane #3: Sample 34 FT
Lane #4: Sample 34 Wash
Lane #5: Sample 34 Eluate #1
Lane #6: Sample 34 Eluate #2
Lane #7: MW Marker
Lane #8: Celite512 FT
Lane #9: Celite512 Wash
Lane #10: Celite512 Eluate #1
Lane #11: Celite512 Eluate #2
Lane #12: MW Marker

** See Figure 1A for corresponding MW size for each band

FIG. 5D

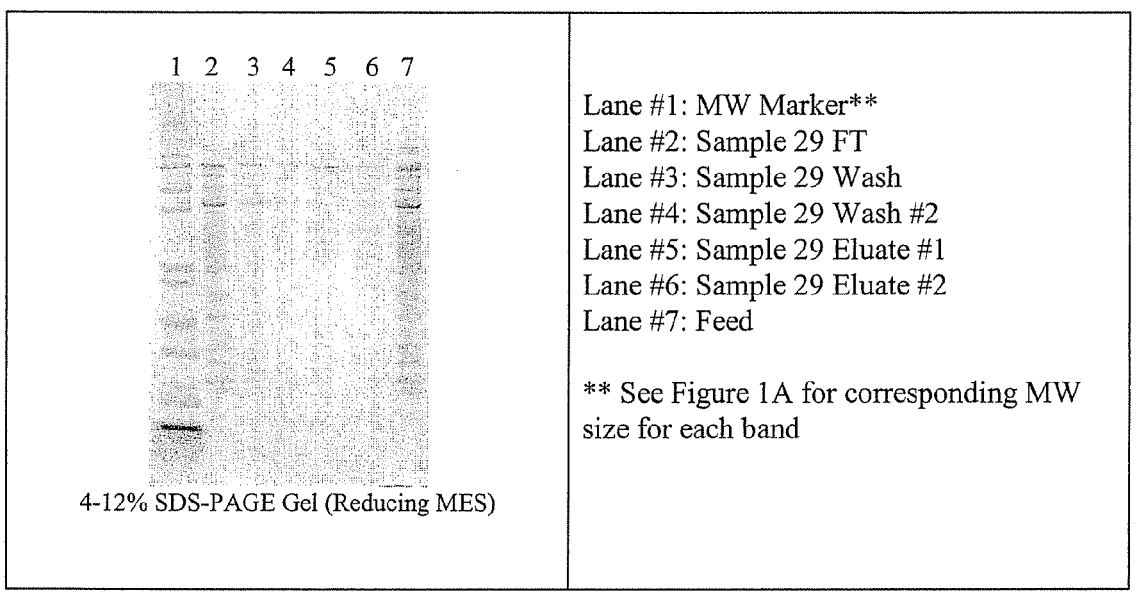

Lane #1: MW Marker**
Lane #2: Sample 29 FT
Lane #3: Sample 29 Wash
Lane #4: Sample 29 Wash #2
Lane #5: Sample 29 Eluate #1
Lane #6: Sample 29 Eluate #2
Lane #7: Feed

** See Figure 1A for corresponding MW size for each band

FIG. 7A

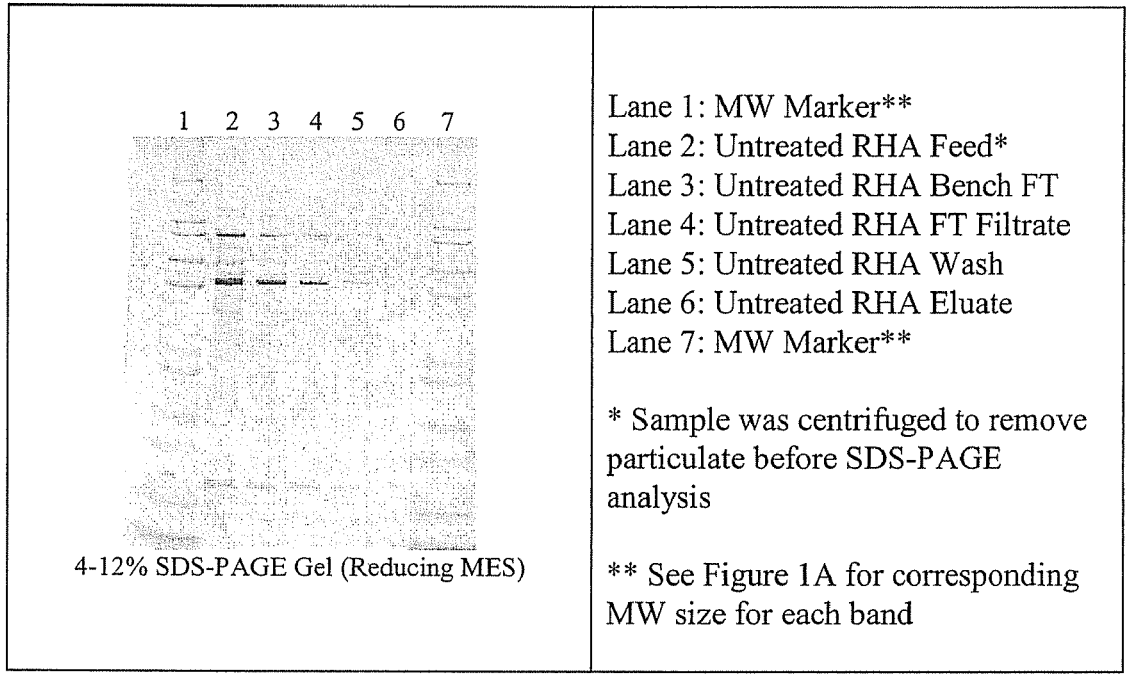

4-12% SDS-PAGE Gel (Reducing MES)

Lane 1: MW Marker**
Lane 2: Untreated RHA Feed*
Lane 3: Untreated RHA Bench FT
Lane 4: Untreated RHA FT Filtrate
Lane 5: Untreated RHA Wash
Lane 6: Untreated RHA Eluate
Lane 7: MW Marker**

* Sample was centrifuged to remove particulate before SDS-PAGE analysis

** See Figure 1A for corresponding MW size for each band

FIG. 7B

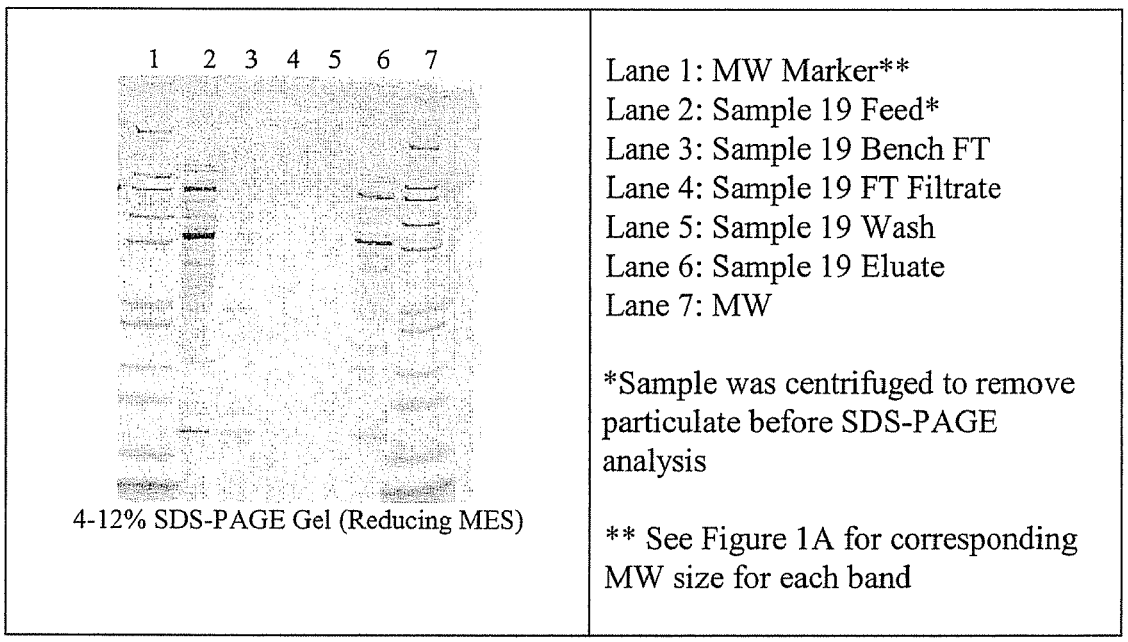

4-12% SDS-PAGE Gel (Reducing MES)

Lane 1: MW Marker**
Lane 2: Sample 19 Feed*
Lane 3: Sample 19 Bench FT
Lane 4: Sample 19 FT Filtrate
Lane 5: Sample 19 Wash
Lane 6: Sample 19 Eluate
Lane 7: MW

*Sample was centrifuged to remove particulate before SDS-PAGE analysis

** See Figure 1A for corresponding MW size for each band

SILANE-TREATED SILICA FILTER MEDIA

This application is a continuation of U.S. application Ser. No. 11/828,275, filed Jul. 25, 2007, now U.S. Pat. No. 7,374,684; which is a continuation of U.S. application Ser. No. 10/830,935, filed Apr. 23, 2004, now U.S. Pat. No. 7,264,728; which is a continuation-in-part of U.S. application Ser. No. 10/677,404, filed Oct. 1, 2003, abandoned; which claims the benefit of provisional application 60/415,474, filed Oct. 1, 2002. The above-identified applications are incorporated herein by reference in their entirety.

FIELD OF THE INVENTION

The present invention relates to methods for separating one or more components of interest from a sample containing particulate matter and soluble components. More particularly, the invention relates to the use of silane-treated silica filter media such as rice hull ash for separating protein and capturing particulates simultaneously. Examples of particulates include microorganisms.

BACKGROUND OF THE INVENTION

The production of materials in biotechnology involves the isolation, separation, and purification of a specific material that is surrounded by many other biological components. It does not matter whether the material comes from fermentation, a transgenic plant or the milk of a transgenic goat; the material of interest must be collected in a reasonably pure form. When the starting mixture is very complex, isolation of the material of interest can be especially difficult and often requires costly operations. Technologies that reduce the number of separation operations and simplify recovery procedures are in high demand in biotechnology and several other industries including water treatment, food and beverage, and chemicals.

Separation of product from microorganisms is important because microbial contamination is a common problem across many industries, including brewing, winery, juice and beverages, dairy, industrial enzyme and pharmaceutical. Heat sterilization and size-based filtration are by far the most commonly used processes to address this. Each of these methods has its advantages and disadvantages. The main drawback of heat sterilization is its application is limited to products that are not affected by high temperature. Sized-based filtration has the disadvantages of being expensive and time consuming. In addition, it cannot be used for processes in which the desired components are of the same size as bacteria, such as in the dairy food industry.

Examples of technologies that have been developed to simplify separations include Expanded Bed Adsorption and Chromatography. Expanded Bed Adsorption allows the capture of a soluble component from a fermentation mixture containing both soluble and particulate components. This method does not require a pre-filtration step prior to applying the sample to the bed. The fermentation mixture flows upward through a bed of adsorbent beads; the upward flow lifts and suspends the beads as the bed expands upward. The soluble components are captured by the beads while the particulate matter flows around the beads and exits the top of the bed. Then the soluble components are recovered from the beads by an elution step. This technology is not widely used yet as there are several technical hurdles including scale-up difficulty, maintaining a stable bed, carry-over of beads out of the top of the bed, fouling of the beads by the fermentation mixture, cleaning and re-use of the beads, usable life of the beads, and variable pressure drop during the course of the adsorption step.

Solid-Liquid Chromatography is any separation process that depends on solute(s) partitioning between a flowing fluid and a solid adsorbent. Many different solid adsorbents (generally referred to as "stationary-phase packing") are used in chromatography. Different stationary-phase packings give rise to different chromatographic techniques, which are generally classified according to their mechanism of interactions. The interactions could be through one or more of the following mechanisms: charge (ion-exchange chromatography); van der Waals forces (hydrophobic interaction chromatography); size and shape (size exclusion); affinity (for example, protein-A, biotin-avidin, biotin-streptavidin, lectin, antibodies, pectin, dye ligand, immobilized metal affinity) (Reference: "Biochemical Engineering" by Harvey W. Blanch and Douglas S. Clark, Marcel Dekker Inc, 1996; p 502-506). Custom Affinity Chromatography is designed to capture a specific protein and requires a specific affinity medium with a specific ligand for each protein to be captured. Considerable time, effort, and cost are involved in developing this specific medium. In general, chromatography requires a pre-filtration step to remove solid materials.

Filtration is the removal of particulates by passing a feed stream through a porous media. Particulates are captured on the media through a variety of mechanisms including direct impaction, sieving, and others. Filtration methods employing various types of media have been used to remove particulates in such applications as wastewater treatment, winemaking, beverage making, and industrial enzyme production.

Filter media, also known as filter aids, can be loose particulate or structured material. They are solid materials in a particulate form, insoluble in the liquid to be filtered; they are added to the liquid or are coated upon a filter or filter support. The purpose of using filter media is to speed up filtration, reduce fouling of the filter surface, reduce cracking of the filter layer, or otherwise to improve filtration characteristics. Materials, which are frequently used as filter media, include cellulose fibers, diatomaceous earth, charcoal, expanded perlite, asbestos fibers and the like.

Filter media are often described according to their physical form. Some filter media are essentially discrete membranes, which function by retaining contaminants upon the surface of the membrane (surface filters). These filter media primarily operate via mechanical straining, and it is necessary that the pore size of the filter medium be smaller than the particle size of the contaminants that are to be removed from the fluid. Such a filter medium normally exhibits low flow rates and a tendency to clog rapidly.

Other filter media take the form of a porous cake or bed of fine fibrous or particulate material deposited on a porous support or substrate. The solution being filtered must wend its way through a path of pores formed in the interstices of the fine material, leaving particulate contaminants to be retained by the filter material. Because of the deepness of the filter material, the filters are called depth filters (as opposed to surface filters). Depth filters typically retain contaminants by both the sieving mechanism and the electrokinetic particle capture mechanism. In the electrokinetic particle capture mode, it is unnecessary that the filter medium have such a small pore size. The ability to achieve the required removal of suspended particulate contaminants with a filter medium of significantly larger pore size is attractive inasmuch as it allows higher flow rates. Furthermore, the filters have a higher capacity to retain particulates, thus having a reduced tendency to clog.

Biotechnology and other industries need efficient, cost-effective methods to isolate components of interest. It is also desirable to use low-cost raw materials for the process of separating biomolecules.

Rice hull ash is a byproduct of rice farming and rice is a primary food staple for half of the world's population. Currently, the inedible rice hulls are used as a source of fuel, fertilizer, and in insulation applications. When rice hulls are burned, a structured particle material having free acidic hydroxyl moieties (OH or Particle-OH) on the surface much like particle-OH of precipitated silica or fumed silica can be produced as a byproduct that has been demonstrated to be useful as a filter aid. U.S. Pat. No. 4,645,605 discloses the use of rice hull ash as filtration media.

U.S. Pat. No. 4,645,567 discloses that the filtration of fine particle size contaminants from fluids has been accomplished by the use of various porous filter media through which the contaminant fluid is passed. To function as a filter, filter media must allow the fluid (commonly water) through, while holding back the particulate. This holding back of the particulate is accomplished by distinctly different filtration mechanisms, namely (a) mechanical straining and (b) particle capturing. In mechanical straining, a particle is removed by physical entrapment when it attempts to pass through a pore smaller than itself. In particle capturing, the particle collides with a surface face within the porous filter media and is retained on the surface by short-range attractive forces.

WO 02/083270 discloses a filter system for passive filtration. The system comprising: a housing with an intake and an outlet; a pleated carbon filter disposed between the intake and the outlet for filtering out vapors entering the intake; and a hydrophobic solution including a silane composition dispersed about the pleated carbon filter to inhibit adsorption of water thereby increasing the adsorption capacity of the pleated carbon filter especially in high relative humidity environments and wherein the hydrophobic solution is selected so that it does not decrease the adsorption capacity of the carbon filter.

U.S. Pat. No. 6,524,489 discloses advanced composite media comprising heterogeneous media particles, each of said media particles comprising: (i) a functional component selected from the group consisting of diatomite, expanded perlite, pumice, obsidian, pitchstone, and volcanic ash; and (ii) a matrix component selected from the group consisting of glasses, natural and synthetic crystalline minerals, thermoplastics, thermoset plastics with thermoplastic behavior, rice hull ash, and sponge spicules; wherein said matrix component has a softening point temperature less than the softening point temperature of said functional component; and wherein said functional component is intimately and directly bound to said matrix component. The surface of the advanced composite media can be treated with dimethyldichlorosilane, hexamethyldisilazane, or aminopropyltriethoxysilane.

Snyder, et al. disclose chromatography bonded-phase packing prepared by the reaction of organosilanols, organodimethylamine, or organoalkoxy silanes with high surface area silica supports without polymerization. (L. R. Snyder and J. J. Kirkland, *Introduction to Modern Liquid Chromatography*, 2nd edition, Wiley-Interscience, N.Y. 1979. 272-280)

Roy, et al (*J. Chrom. Sci.* 22: 84-86 (1984)) disclose the preparation of ion-exchange (DEAE, carboxy, and sulfonic) silica using the epoxy functionality of glycidoxypropylsilyl silica; the ion-exchange silica was used in column chromatography to separated bovine serum albumin and bovine γ-globulin.

In general, treated chromatographic silica of the type described by Snyder and Roy are too expensive to be used in larger scale routine filtration and isolation processes.

There is a need for an improved and less costly separation system that is suitable for large-scale isolation of components of interest from a sample. Such a system uses low-cost raw materials and is suitable for a large-scale production and requires no pretreatment of a sample.

SUMMARY OF THE INVENTION

The present invention provides methods for separating one or more components, especially biomolecules of interest, from a sample containing particulates and soluble materials. The feature of the invention is filtering a sample through filter media whose surface has been treated by one or more silanes. Preferred filter media are silica filter media. The methods provide simultaneously capturing the particulate by filtration and binding soluble materials onto the silica filter media.

One method of the invention comprises the steps of: (a) filtering a sample through the treated silica filter media, (b) simultaneously capturing particulates and binding a soluble component of interest to the silica filter media, and (c) eluting the bound soluble component of interest from the silica filter media.

Another method of the invention comprises the steps of: (a) filtering a sample through treated silica filter media, (b) simultaneously capturing particulates and binding unwanted soluble materials to the silica filter media, (c) collecting the flow-through stream, and (d) recovering the soluble component of interest from the flow-through stream.

Another method of the invention comprises the steps of: (a) filtering a sample through treated silica filter media; (b) simultaneously removing particulate and binding a first soluble component of interest to the silica filter media, (c) collecting the flow-through stream, (d) recovering a second soluble component of interest from the flow-through stream, (e) eluting the bound first soluble component of interest from the silica filter media, and (f) recovering the first soluble component of interest.

In one embodiment of the invention, the particulates are microorganisms. In addition to being captured by the silane-treated filter media, microorganisms are also found killed by contacting with the silane-treated filter media.

The present invention is also directed to the silane-treated filter media. Preferred treated silica filter media are silane-treated rice hull ash with a functional quaternary ammonium group(s) or a functional sulphonate group(s).

BRIEF DESCRIPTION OF THE DRAWINGS

FIG. 2 shows protein binding and protein release using surface-treated rice hull ashes.

FIG. 3 shows protein binding and protein release using surface-treated rice hull ashes. FIG. 3C shows the results of samples 16 and 17. FIG. 3D shows the results of samples 18 and 19.

FIG. 4 shows protein binding and protein release using surface-treated rice hull ashes. FIG. 4A shows the results of silica filter media sample 41 and untreated RHA. FIG. 4B shows the results of porous HS50.

FIG. 5 shows protein binding and protein release. FIG. 5A shows the results of silica filter media sample 42. FIG. 5B shows the results of sample 40 and untreated RHA. FIG. 5C shows the results of Celite 512. FIG. 5D shows the results of sample 29 and untreated RHA.

FIG. 7A shows untreated rice hull ash, and FIG. 7B shows silica filter media sample 19, for simultaneous particulate filtration and soluble capture/release.

DETAILED DESCRIPTION OF THE INVENTION

Figure 1A:
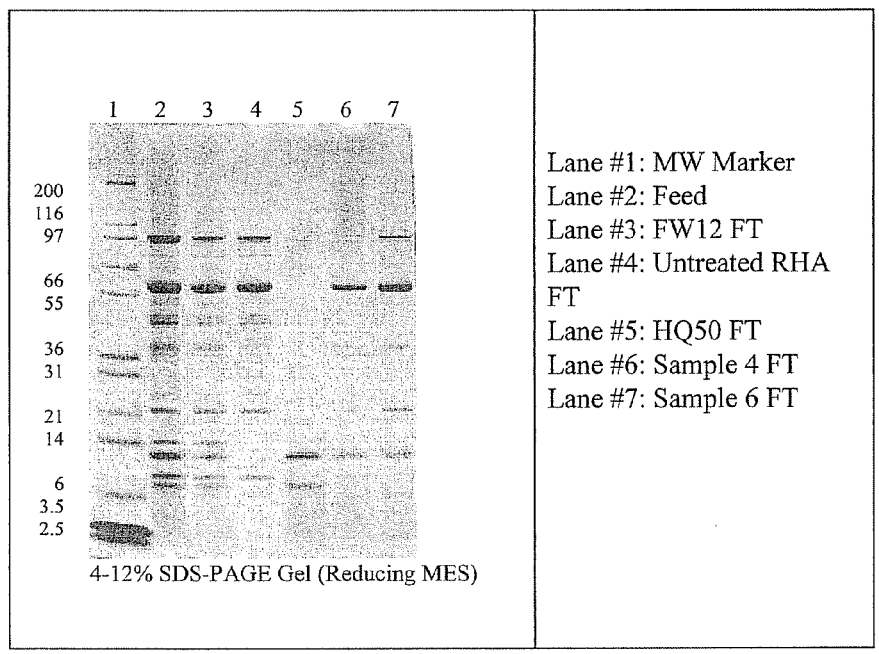
FIG. 1A shows protein binding.

The present invention relates to a method for separating one or more components of interest from a sample. One embodiment of the invention comprises the steps of: (a) filtering a sample containing particulate and soluble components through silica filter media whose surface has been treated with one or more silanes, (b) simultaneously capturing particulates and binding a soluble biomolecule of interest to the silica filter media, and (c) eluting the bound soluble component of interest from the silica filter media. In this embodiment, the molecule of interest is first bound to the silica filter media and recovered later by elution. Optionally, an insoluble component of interest can be recovered from the particulates.

Another embodiment of the invention comprises the steps of: (a) filtering a sample containing particulate and soluble materials through silica filter media whose surface has been treated with one or more silanes, (b) simultaneously capturing particulates and binding unwanted soluble materials to the silica filter media, (c) collecting the flow-through stream, and (d) recovering the soluble component of interest from the flow-through stream. The soluble component of interest can be further purified from the flow-through stream. In this embodiment, the soluble component of interest does not bind to the silica filter media and is recovered in the flow-through. Optionally, an insoluble component of interest can be recovered from the particulates.

Yet another embodiment of the invention comprises the steps of: (a) filtering a sample containing particulate and soluble materials through silica filter media whose surface has been treated with one or more silanes; (b) simultaneously capturing particulates and binding a first soluble component of interest to the silica filter media, (c) collecting the flow-through stream, (d) recovering a second soluble component of interest from the flow-through stream, (e) eluting the bound first soluble component of interest from the silica filter media, and (f) recovering the first soluble component of interest. In this embodiment, the first component of interest binds to the silica filter media and the second component of interest does not bind to the silica filter media. Optionally, an insoluble component of interest can be recovered from the particulates.

The present invention optionally comprises an additional step. Prior to the filtering step (step (a)), a sample containing particulate and soluble materials first reacts with the treated silica filter media for a period of time to allow sufficient binding of the component to surface of the treated silica filter media. The reaction is carried out by mixing the sample with the treated silica filter media by any means of mechanical mixing such as agitation, stirring, vortexing, etc. After the component binds to the treated silica filter media, the mixture is applied to a filtration device and the sample is subsequently filtered through the filter media.

The term "sample" refers to any mixture containing multiple components in the form of a liquid, solution, suspension or emulsion. The sample usually includes soluble components and particulates. Of special interest are "biological samples" which refers to biological tissue and/or fluid that contains biomolecules such as polypeptides, lipids, carbohydrates, lipoproteins, polysaccharides, sugars, fatty acids, polynucleotides, or viruses. A biological sample may contain sections of tissues such as frozen sections taken for histological purposes. A sample suitable for this invention includes cell lysate, culture broth, food products and particularly dairy products, blood, beverages (for example, juice, beer, wine), and a solution or a suspension containing biomolecules such as proteins. "Proteins" are natural, synthetic, and engineered peptides or polypeptides, which include enzymes such as oxidoreductases, transferases, isomerases, ligases, and hydrolases, antibodies, hormones, cytokines, growth factors, and other biological modulators.

Filtration is the removal of particulates by passing a feed stream through a porous media. Particulates are captured on the media through a variety of mechanisms including physical entrapment, and binding to the media. The present invention utilizes silica media filter of various types to remove particulates in different applications, including wastewater treatment, winemaking, juice and beverage making, diary, and industrial production of proteins such as enzymes.

The term "particulates" refers to macroscopic insolubles or microscopic particulates. Macroscopic particulates are those that are visible to the human eye, including, but not limited to precipitates, inclusion bodies, and crystals. Inclusion bodies consist of insoluble and incorrectly folded protein in the cellular compartment. Crystals are formed from supersaturated solutions by aggregation of molecules, occurring in an ordered, repetitive fashion. Precipitates are amorphous form from random aggregation. Macroscopic particulates can be of organic or inorganic origin; they can be derived from the interaction between protein and protein, salt and protein, salt and salt, protein and polymer, etc. Microscopic particulates are those that can be seen under a microscope. Examples of particulates include microorganisms. Microorganisms suitable to be captured and removed from a biological sample by the present invention are gram-positive bacteria, gram-negative bacteria, fungi, yeast, mold, virus, etc.

The feature of this invention is using treated silica filter media in a filtration process to simultaneously bind soluble components onto the silica filter media and capture particulates from a solution by filtration. The present invention eliminates a pre-filtration step often required in a chromatography process to remove particulate. Soluble components bind to the silane-treated silica filter media through different mechanisms such as hydrophilic, hydrophobic, affinity and/or electrostatic interactions. Silica filter media useful for this invention have surfaces suitable for treatment with silanes and structural characteristics suitable for industrial filtration applications. Examples of silica filter media include, but are not limited to, rice hull ash, oat hull ash, diatomaceous earth, perlite, talc, and clay.

Rice hull ash is a byproduct of rice farming. Each grain of rice is protected with an outer hull, which accounts for 17-24% of the rough weight of the harvested product. Rice hulls consist of 71-87% (w/w) organic materials, such as cellulose and 13-29% (w/w) inorganic materials. A significant portion of the inorganic fraction, 87-97% (w/w) is silica ($SiO_2$). Currently, the inedible rice hulls are used as a source of fuel, fertilizer, and in insulation applications. When the rice hulls are burned, a structured silica material (often greater than 90%) can be produced as a byproduct. Rice hull ash (RHA) has larger surface area and more porous-channeled structure compared with other loose silica filter media. These characteristics make the RHA a preferred treated filter substrate for this invention.

Diatomaceous earth (Diatomite) is a sedimentary silica deposit, composed of the fossilized skeletons of diatoms, one celled algae-like plants which accumulate in marine or fresh water environments. The honeycomb silica structures give diatomite useful characteristics such as absorptive capacity and surface area, chemical stability, and low bulk density. Diatomite contains 90% $SiO_2$ plus Al, Fe, Ca and Mg oxides.

Perlite is a generic term for a naturally occurring siliceous volcanic rock that can be expanded with heat treatment. Expanded perlite can be manufactured to weigh as little as 2 pounds per cubic foot (32 kg/m$^3$). Since perlite is a form of natural glass, it is classified as chemically inert and has a pH of approximately 7. Perlite consists of silica, aluminum, potassium oxide, sodium oxide, iron, calcium oxide, and magnesium oxide. After milling, perlite has a porous structure that is suitable for filtration of coarse microparticulates from liquids it is suitable for depth filtration.

Talc (talcum) is a natural hydrous magnesium silicate, 3 $MgO.4SiO_2.H_2O$. Clay is hydrated aluminum silicate, $Al_2O_3.SiO_2.xH_2O$. Mixtures of the above silica filter media substrates can also be used to achieve the best filtration and cost performance. The rice hull ash or diatomaceous earth has optionally undergone various purification and/or leaching steps before the surface silane treatment.

Silica filter media are treated by binding a predetermined amount of functional silane (or silanes) to the surface. The treated silica filter media capture components, for example, by electrostatic, hydrophilic, hydrophobic, affinity interactions, and/or by physical entrapment. By electrostatic interaction, the charged silica filter media bind to materials in a sample that have the opposite charge. By hydrophilic interaction, the portion of the silica filter media that has a strong affinity for water attracts the polar group of the materials by van der Waals interaction. By hydrophobic interaction, the portion of the silica filter media that contains long hydrocarbon chains attracts the non-polar groups of the materials. The treated silica filter media selectively capture materials (desired or undesired) during the separation process, which results in better separation characteristics comparing with non-treated silica filter media. The treated silica filter media preferably have a similar or improved flow rate compared with the non-treated silica filter media.

The form of silica filter media substrate materials can be any form suitable for the application, such as spheres, fibers, filaments, sheets, slabs, discs, blocks, films, and others. They can be manufactured into cartridges, disks, plates, membranes, woven materials, screens etc. The specific surface area of the untreated silica filter media is preferred to be larger than 1 m$^2$/g; more preferred to be larger than 10 m$^2$/g. Silica filter media with a larger surface area are preferable because they allow more treatment on the surface. In addition, media with large pores improve the filtration rate. However, larger pore materials have relatively lower surface area. The balance of large surface area and large pore size results in effective surface filtration treatment and filtration rate. The surface characteristics of these substrates can be evaluated by techniques such as NMR (Nuclear Magnetic Resonance and other techniques), SEM (Scanning Electron Microscopy), BET (Brunauer-Emmett-Teller) surface area measurement technique, and Carbon-hydrogen-nitrogen content can be determined by combustion techniques, which are well known to the art.

Silanes suitable for surface treatment of silica filter media can be any type of organosilanes, ionic or non-ionic. The general formula of the suitable silane is $(R^1)_x Si(R^2)_{3-x} R^3$, wherein $R^1$ is typically a hydrolysable moiety (such as alkoxy, halogen, hydroxy, aryloxy, amino, amide, methacrylate, mercapto, carbonyl, urethane, pyrrole, carboxy, cyano, aminoacyl, or acylamino, alkyl ester, or aryl ester), which reacts with the active group on the silica filter media; a preferred hydrolysable moiety is alkoxy group, for example, a methoxy or an ethoxy group;

$1 \leq x \leq 3$, more than one siloxane bond can be formed between the filter particle and silane;

$R^2$ can be any carbon-bearing moiety that does not react with the filter surface during treatment process, such as substituted or unsubstituted alkyl, alkenyl, alkaryl, alkcycloalkyl, aryl, cycloalkyl, cycloalkenyl, heteroaryl, heterocyclic, cycloalkaryl, cycloakenylaryl, alkcycloalkaryl, alkcycloalkenyaryl, or arylalkaryl;

$R^3$ can be any organic containing moiety that remains chemically attached to the silicon atom once the surface reaction is completed, and preferably it can interact with the component of interest during filtration; for example $R_3$ is hydrogen, alkyl, alkenyl, alkaryl, alkcycloalkyl, aryl, cycloalkyl, cycloalkenyl, heteroaryl, heterocyclic, cycloalkaryl, cycloakenylaryl, alkcycloalkaryl, alkcycloalkenyaryl, arylakaryl, alkoxy, halogen, hydroxy, aryloxy, amino, amide, methacrylate, mercapto, carbonyl, urethane, pyrrole, alkyl ester, aryl ester, carboxy, sulphonate, cyano, aminoacyl, acylamino, epoxy, phosphonate, isothiouronium, thiouronium, alkylamino, quaternary ammonium, trialkylammonium, alkyl epoxy, alkyl urea, alkyl imidazole, or alkylisothiouronium;

wherein the hydrogen of said alkyl, alkenyl, aryl, cycloalkyl, cycloalkenyl, heteroaryl, and heterocyclic is optionally substituted by halogen, hydroxy, amino, carboxy, or cyano.

One or more silanes can be covalently bound to the surface of the hydroxyl bearing porous silica filter media. The surface area of the silica filter media limits the amount of the silanes bound.

Silanes useful for treating silica in this invention preferably have one or more moieties selected from the group consisting of alkoxy, quaternary ammonium, aryl, epoxy, amino, urea, methacrylate, imidazole, carboxy, carbonyl, isocyano, isothiorium, ether, phosphonate, sulfonate, urethane, ureido, sulfhydryl, carboxylate, amide, carbonyl, pyrrole, and ionic. Examples for silanes having an alkoxy moiety are mono-, di-, or trialkoxysilanes.

Examples of silanes having a quaternary ammonium moiety are 3-(trimethoxysilyl)propyloctadecyldimethylammoniumchloride, N-trimethoxysilylpropyl-N,N,N-trimethylammoniumchloride, or 3-(N-styrylmethyl-2-aminoethylamino)-propyltrimethoxysilane hydrochloride. Examples of silanes having an aryl moiety are 3-(trimethoxysilyl)-2-(p,m-chlandomethyl)-phenylethane, 2-hydroxy-4-(3-triethoxysilylpropoxy)-diphenylketone, ((chloromethyl) phenylethyl)trimethoxysilane and phenyldimethylethoxysilane. Examples of silanes having an epoxy moiety are 3-glycidoxypropyltrimethoxysilane and 2-(3,4-epoxycyclohexyl)ethyltrimethoxysilane. Examples of silanes having an amino moiety are 3-aminopropyltrimethoxysilane, N-(2-aminoethyl)-3-aminopropyltrimethoxysilane, trimethoxysilylpropyldiethylenetriamine, 2-(trimethoxysilylethyl)pyridine, N-(3-trimethoxysilylpropyl)pyrrole, trimethoxysilylpropyl polyethyleneimine, bis-(2-hydroxyethyl)-3-aminopropyltriethoxysilane, and bis(2-hydroxyethyl)-3-aminopropyltriethoxysilane. Examples of silanes having an urea moiety are N-(triethoxysilylpropyl)urea and N-1-phenylethyl-N'-triethoxysilylpropylurea. An example of silanes having a methacrylate moiety is 3-(trimethoxysilyl) propyl methacrylate. An example of silanes having a sulfhydryl moiety is 3-mercaptopropyltriethoxysilane. Examples of silanes having an imidazole moiety are N-[3-(triethoxysilyl) propyl]imidazole and N-(3-triethoxysilylpropyl)-4,5-dihydroimidazole. Examples of ionic silanes are 3-(trimethoxysilyl)propyl-ethylenediamine triacetic acid trisodium salt; and 3-(trihydroxysilyl)propylmethylphosphonate sodium salt. An examples of silanes having a carbonyl moiety is 3-(triethoxysilyl)propylsuccinic anhydride. Examples of silanes having an isocyano moiety are tris(3-trimethoxysilylpropyl)isocyanurate and 3-isocyanatopropyltriethoxysilane. Examples of silanes having an ether moiety are bis[(3-methyldimethoxysilyl)propyl]-polypropylene oxide and N-(triethoxysilyl)propyl)-O-polyethylene oxide urethane.

An example of a silane having a sulfonate moiety is 2-(4-chlorosulfonylphenyl)-ethyltrichlorosilane. An example of a silane having a isothiourium moiety is trimethoxysilylpropylisothiouronium chloride. Examples of silanes having an amide moiety are triethoxysilylpropylethyl-carbamate, N-(3-triethoxysilylpropyl)-gluconamide, and N-(triethoxysilylpropyl)-4-hydroxybutyramide. Examples of silanes having a urethane moiety are N-(triethoxysilylpropyl)-O-polyethylene oxide urethane and O-(propargyloxy)-N-(triethoxysilylpropyl)urethane.

Silica filter media can also be treated with more than one silanes such as 3-aminopropyltrimethoxysilane and N-(triethoxysilylpropyl)-O-polyethylene oxide urethane; 3-trihydrosilylpropylmethylphosphonate, sodium salt and N-(triethoxysilylpropyl)-O-polyethylene oxide urethane; N-trimethoxysilylpropyl-N,N,N-trimethylammonium chloride and (3-glycidoxypropyl)trimethoxysilane; 3-trihydrosilylpropylmethylphosphonate, sodium salt and bis-(2-hydroxyethyl)-3-aminopropyltriethoxysilane; 3-(N-styrylmethyl-2-aminoethylamino)-propyltrimethoxysilane hydrochloride and N-(triethoxysilylpropyl)-O-polyethylene oxide urethane; 2-(trimethoxysilylethyl)pyridine and N-(3-triethoxysilylpropyl)-gluconamide; N-trimethoxysilylpropyl-N,N,N-trimethylammonium chloride and N-(3-triethoxysilylpropyl)-gluconamide; N-trimethoxysilylpropyl-N,N,N-trimethylammonium chloride and 2-hydroxy-4-(3-triethoxysilylpropoxy)-diphenylketone; 3-mercaptopropyltriethoxysilane and N-(triethoxysilylpropyl)-O-polyethylene oxide urethane; 3-(triethoxysilyl)propylsuccinic anhydride and N-(triethoxysilylpropyl)-O-polyethylene oxide urethane; trimethoxysilylpropyl-ethylenediamine, triacetic acid, trisodium salt and N-(triethoxysilylpropyl)-O-polyethylene oxide urethane; 2-(4-chlorosulfonylphenyl)-ethyltrichlorosilane and N-(triethoxysilylpropyl)-O-polyethylene oxide urethane; and 2-(4-chlorosulfonylphenyl)-ethyltrichlorosilane and bis-(2-hydroxyethyl)-3-aminopropyltriethoxysilane.

The silane-treated silica filter media have a general formula selected from the group consisting of particle-O—Si(R$^1$)$_x$(R$^2$)$_{3-x}$R$^3$,

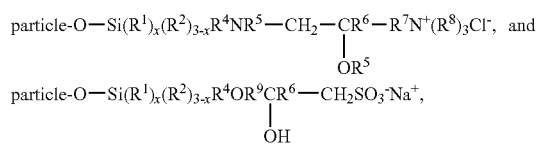

wherein R$^1$, R$^2$, R$^3$, and x are the same as described above so long as there are no more than four groups directly attached to the silicon (Si);

R$^5$, R$^6$, R$^8$ are independently hydrogen, substituted or unsubstituted alkyl, alkenyl, alkaryl, alkcycloalkyl, aryl, cycloalkyl, cycloalkenyl, heteroaryl, heterocyclic, cycloalkaryl, cycloakenylaryl, alkcycloalkaryl, alkcycloalkenyaryl, ether, ester or arylalkaryl;

R$^4$, R$^7$, R$^9$ are substituted or unsubstituted alkyl, alkenyl, alkaryl, alkcycloalkyl, aryl, cycloalkyl, cycloalkenyl, heteroaryl, heterocyclic, cycloalkaryl, cycloakenylaryl, alkcycloalkaryl, alkcycloalkenyaryl, or arylalkaryl radicals capable of forming two covalent attachments.

The silica filter media with surface silanol are treated with silane in a general reaction scheme as following:

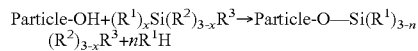

where Particle-OH is a filter particle with reactive sites on surface. For example, R$^1$ is a methoxy (CH$_3$O—) or ethoxy (CH$_3$CH$_2$O—) labile leaving group of the silane, which chemically interacts, with the reactive hydroxyl group on the particle surface or with other reactive hydrolyzed silane molecules which are not attached to the surface. $1 \leq x \leq 3$; n is the number of R$^1$ groups reacted, and $n \leq x$.

Prolonged reaction of excess amounts of reactive silane under anhydrous conditions results in reaction of only 25% to 50% of the total active sites on the porous material since further reaction is inhibited by steric hindrance between the immobilized residues and is also hindered by access to deeply imbedded Particle-OH groups. For the purposes of this invention, such sterically available sites will be designated as the "saturation coverage" and "saturation coverage" depends upon the steric requirements of a particular residue. Note that this designation of "saturation coverage" is applicable to reactive silanes with one or more labile leaving groups. Under anhydrous conditions, such silanes form monolayers and cannot form multiple layers of undefined saturation. However, under aqueous conditions, multiple layers can be built on the surface with multifunctional silanes.

The surface silane treatment of silica filter media can be carried out by an essentially "wet" or essentially "dry" process. The essentially wet process consists of reacting the silane onto the silica filter media in a solvent (organic solvent or water) and optionally using heat. Heat or solvent is not required for the reaction; however, heat or solvent improves the reaction rate and the uniform surface coverage. The essentially dry process consists of reacting the silane onto the silica filter media in a vapor phase or highly stirred liquid phase by directly mixing the silane with silica filter media and subsequently heating.

A preferred method for treating silica filter media with silanes is adding the reacting silanes gradually to a rapidly stirred solvent, which is in direct contact with the porous silica filter media. Another preferred method is to carry out the treatment in the vapor phase by causing the vapor of the reactive silanes to contact and react with the silica filter media. For example, the porous material is placed in a vacuum reactor and dried under vacuum. The rapidly reacting silane is then allowed to enter the vacuum chamber as a vapor and contact the porous material; after a certain contact time, the byproducts of the reaction are removed under reduced pressure. Then the vacuum is released, and the porous material is removed from the chamber.

The actual treatment process can be carried out in a period from 1 minute to 24 hours. Generally, for purposes of this invention, it is preferred to carry out the treatment over a period from about 30 minutes to 6 hours to ensure that the surface of the filter aid material is uniformly treated. The treatments are carried out at temperatures ranging from 0 to 400° C. Preferred treatment temperatures are from room temperature (22 to 28° C.) to 200°.

The amount of reacting silanes used in this invention depends on the number of surface hydroxyls to be reacted, and the molecular weight of the silane. Typically, a stoichiometric amount equivalent to the available surface hydroxyls plus some excess amount of the reacting silane is used to treat the surface hydroxyls because of the potential side reactions. If a thicker exterior surface treatment is desired, then more reacting silane should be used. Typically, 0 to 10 (preferred), 0 to 20, or 1 to 50 times excess is used. However, it is not uncommon to use from 1 to 500 times excess; which results in more treatment on the particle.

Silanes with hydrolysable groups condense with Particle-OH groups of the surface of the particles, and provide covalent coupling of organic groups to these substrates. For example, the alkoxy groups of the silanes chemically react with the Particle-OH groups of the particle surface. The surface-silane interaction is fast and efficient. For example, when silanes having a quaternary ammonium moiety are used, the protonated positively charged silanes electrostatically attract to the deprotonated groups of the particle efficiently to facilitate fast and efficient reaction.

Silane-reacted silica filter media preferably have a functional moiety, which can react with a component of interest. The functional moiety is selected from the group consisting of quaternary ammonium, epoxy, amino, urea, methacrylate, imidazole, sulphonate and other organic moieties known to react with biological molecules. In addition, the functionally moiety can be further reacted, using well-known methods, to create further new functionalities for other interactions. General schemes for preparation of a silane-reacted particle filter media with a functional quaternary ammonium or sulphonate group are illustrated as follows.

Silane-reacted particle filter media with a functional quaternary ammonium group can be prepared in one step. Optionally, a two step or three step process may be employed. For example, in the first step of the two step process, the particle surface is reacted with an amino-functional silane, $(R^1)_x Si(R^2)_{3-x} R^4 N(R^5)_2$, applying the previously described procedure. In the next step, the secondary amine readily reacts with the epoxide group of the glycidyltrimethylammoniumchloride, which is a convenient way to introduce quaternary ammonium functionality. (See Scheme 1)

Scheme 1. Synthesis of quaternary ammonium functional filter aid in two steps.

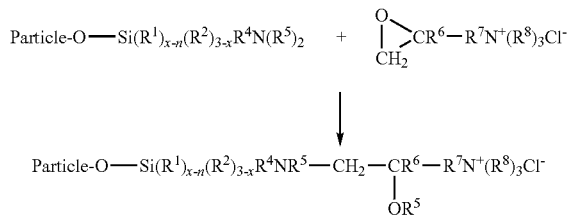

Silane-reacted silica filter media with a functional sulphonate group can be prepared in two steps. In the first step, the particle surface is reacted with an epoxy-functional silane applying the previously described procedure. In the next step, the epoxy functionality readily reacts with sodium bisulfate to produce sulphonate-functional silica filter media. (See Scheme 2). Sodium metabisulfite ($Na_2S_2O_5$) decomposes in water to form sodium bisulfate ($NaHSO_3$).

Scheme 2. Synthesis of sulphonate-functional silica filter media

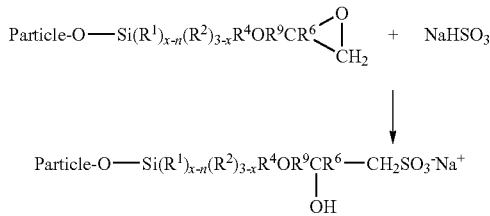

The silane-treated particles are used in separation applications to capture soluble materials through electrostatic, and/or hydrophobic, and/or hydrophilic interaction mechanisms while removing particulates. The advantage of the treated silica filter media is that the separation process is simplified by combining the filtration and solid phase extraction in a single step. The desired quality of the treated silica filter media is to have similar or improved flow rate (filtration properties) to the untreated silica filter media along with the capability to capture soluble materials through sorption in a single operation.

In one embodiment of the invention, specific charged groups are attached covalently to the surface of the silica particles to capture materials electrostatically. The oppositely charged materials are bound to the porous treated surface. In addition to the electrostatic attraction, hydrophobic or hydrophilic ligands are used to improve the binding and/or release characteristics of the silica filter media by hydrophobic or hydrophilic interaction.

Treated silica filter media are characterized by measuring surface area, pore volume and pore size using methods known to the art such as a Micrometrics® analyzer. For example, surface area can be characterized by BET technique. Pore volume and pore diameter can be calculated by Barrett-Joyner-Halenda analysis. Specific functional groups and molecular structure can be determined by NMR spectroscopy. Carbon-hydrogen-nitrogen content can be determined by combustion techniques; from this analysis information, the treatment level on the particle surface can be calculated.

A sample, such as fermentation broth, can be applied to silane-treated silica filter media without pre-filtration. In one embodiment, the sample is mixed with the treated silica filter media by any means of mechanical mixing (such as agitation, stirring, vortexing, etc.) for a period of time to allow sufficient binding of the component to the surface of treated silica filter media. Those skilled in the art will recognize that the time suitable for binding is dependent upon the character of the pores of the media, the size of the target molecule or component, the viscosity and other known mass transfer limited principles. Generally, the time for binding to occur varies from about a few minutes to a few hours, but may continue up to 1-3 days. The mixture is then filtered using a filtration unit. In another embodiment, a sample can be filtered directly through a filtration unit containing silane-treated silica filter media without pre-mixing the sample with the filter media. The treated silica filter media capture particulates and bind certain soluble components while allowing the unbound soluble components to flow through. The bound component is extracted by flowing an eluting solution through the filtration unit, and is recovered in an eluate stream. Useful eluting solutions include salt solutions, high pH (basic) solutions, low pH (acidic) solutions, chaotropic salts and other reagents. Alternately, common organic solvents or mixtures thereof may be used as long as they do not have deleterious affects on the recovered component of interest. Suitable high salts include NaCl, KCl, LiCl, etc. Suitable chaotropic salts include sodium perchlorate, guanidine hydrochloride, guanidine isothiocyanate, potassium iodide, etc. Other reagents include urea and detergents. Combinations of the above components are also suitable in some applications. Alternately, an eluting solution is used to resuspend the surface silica filter media (containing particulates and bound molecules) by any means of mechanical mixing for a period of time to allow sufficient release of the bound component before filtering.

One application of the invention is to use the silane-treated silica filter media to separate microorganisms from a desired product. Microbial contamination is a common problem across many industries, including brewing, winery, juice and beverages, dairy, industrial enzyme and pharmaceutical. Applicants have found that the silane-treated silica filter media of this invention have anti-microbial activity. By contacting bacteria with the silane-treated silica filter media, the total viable bacterial counts are significantly reduced. The microorganisms are also captured by the silane-treated silica filter media. Thus, the filtration step further removes the microbial contamination from the product.

The present invention is also directed to a silane-treated silica filter media having a general formula selected from the group consisting of particle-O—Si($R^1$)$_x$($R^2$)$_{3-x}$$R^3$,

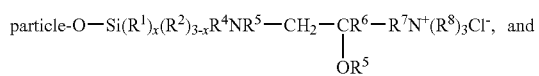

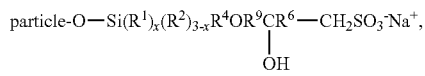

wherein $R^1$ is alkoxy, halogen, hydroxyl, aryloxy, amino, carboxy, cyano, aminoacyl, or acylamino, alkyl ester, or aryl ester;

$R^2$ are independently substituted or unsubstituted alkyl, alkenyl, alkaryl, alkcycloalkyl, aryl, cycloalkyl, cycloalkenyl, heteroaryl, heterocyclic, cycloalkaryl, cycloakenylaryl, alkcycloalkaryl, alkcycloalkenyaryl, or arylalkaryl;

$R^3$ is hydrogen, alkyl, alkenyl, alkaryl, alkcycloalkyl, aryl, cycloalkyl, cycloalkenyl, heteroaryl, heterocyclic, cycloalkaryl, cycloakenylaryl, alkcycloalkaryl, alkcycloalkenyaryl, arylakaryl, alkoxy, halogen, hydroxyl, aryloxy, amino, alkyl ester, aryl ester, carboxy, sulphonate, cyano, aminoacyl, acylamino, epoxy, phosphonate, isothiouronium, thiouronium, alkylamino, quaternary ammonium, trialkylammonium, alkyl epoxy, alkyl urea, alkyl imidazole, or alkylisothiouronium; wherein the hydrogen of said alkyl, alkenyl, aryl, cycloalkyl, cycloalkenyl, heteroaryl, and heterocyclic is optionally substituted by halogen, hydroxyl, amino, carboxy, or cyano;

$R^5$, $R^6$ and $R^8$ are independently hydrogen, substituted or unsubstituted alkyl, alkenyl, alkaryl, alkcycloalkyl, aryl, cycloalkyl, cycloalkenyl, heteroaryl, heterocyclic, cycloalkaryl, cycloakenylaryl, alkcycloalkaryl, alkcycloalkenyaryl, or arylalkaryl;

$R^4$, $R^7$, $R^9$ are substituted or unsubstituted alkyl, alkenyl, alkaryl, alkcycloalkyl, aryl, cycloalkyl, cycloalkenyl, heteroaryl, heterocyclic, cycloalkaryl, cycloakenylaryl, alkcycloalkaryl, alkcycloalkenyaryl, or arylalkaryl radicals capable of forming two covalent attachments;

wherein said silica filter media is rice hull ash or oat hull ash.

The silane-reacted silica filter media of the present invention preferably have a functional moiety, which can react with a component of interest. The functional moiety is selected from the group consisting of quaternary ammonium, epoxy, amino, urea, methacrylate, imidazole, sulphonate and other organic moieties known to react with biological molecules.

The following examples further illustrate the present invention. These examples are intended merely to be illustrative of the present invention and are not to be construed as being limiting. Examples 1 through 5 illustrate the surface treatment of silica filter media. Examples 6 through 14 illustrate the use of the silane treated filter media for separating one or more components of interest from a sample containing particulate matter and soluble components. Examples 15-22 illustrate the antimicrobial activity of the silane-treated silica filter media and the filtration results.

EXAMPLES

Example 1

Preparation of Treated Rice Hull Ash Media (tRHA) Using Trialkoxysilanes in a Batch Process The treatment equipment is composed of a 3-neck, round bottom reaction flask, a Teflon shaft mechanic stirrer, thermometer, condenser, and heating mantle around the flask. The reaction flask was loaded with ungrounded RHA silica filter media (surface area: ~30 m$^2$/g), and solvent mixture. Table 1 shows the reaction conditions for each example. The mixture was stirred for a few minutes at ambient temperature, then the surface modification process involved addition of the proper amount of the silane directly to the mixture in a slow addition rate, while good mixing was maintained. 250% of the proper amount of the silane as calculated to achieve multilayer coverage (high-level treatment) or 85% of the amount of silane as calculated to achieve monolayer coverage (low level treatment) was added and the silane quantity was also corrected for their purity. The loading concentrations are also listed in Table 1. Subsequently, the mixture was heated to reflux under $N_2$ blanket, which is used primarily for safety and has no other affect on the outcome of the reaction, although heating is not required. After 2 hours stirring and refluxing, the treated slurry mixture was allowed to cool. Then it was transferred to a porcelain Büchner funnel outfitted with Whatman filter paper, and attached to a vacuum filter flash. The treated filter slurry was filtered and washed twice with toluene and twice with IPA. Afterward, the sample was dried in the hood for about 24 hours. The treated filter media was transferred to a Pyrex container and covered with a paraffin film having a number of holes made with a syringe needle, and then the sample was dried in a vacuum oven at 60° C. for 2-4 hours. The dried samples were analyzed for surface area, pore structure, and carbon-hydrogen-nitrogen content.

TABLE 1

Summary of treatment compositions and conditions
Treatments are done on low carbon, ungrounded RHA from Producers.

| Sample # | Silica Amount g | Silane Type | Treatment Condition | Silane Purity % | Added Silane g |
|---|---|---|---|---|---|
| 1 | 50 | 3-(trimethoxysilyl)propyloctadecyl-dimethylammonium chloride | H$_2$O, reflux | 42% | 15.06 |
| 2 | 50 | 3-(trimethoxysilyl)propyloctadecyl-dimethylammonium chloride | H$_2$O, room temp. | 42% | 15.06 |
| 3 | 50 | 3-(trimethoxysilyl)propyloctadecyl-dimethylammonium chloride | Toluene, reflux, stochiometric H$_2$O | 42% | 15.06 |
| 4 | 50 | 3-(trimethoxysilyl)propyloctadecyl-dimethylammonium chloride | Toluene, IPA, reflux | 42% | 15.06 |
| 5 | 50 | 3-(trimethoxysilyl)propyloctadecyl-dimethylammonium chloride | Toluene, IPA, reflux, stochiometric H$_2$O at end | 42% | 15.06 |
| 6 | 50 | 3-(trimethoxysilyl)propyloctadecyl-dimethylammonium chloride | Toluene, IPA, reflux | 42% | 7.03 |
| 7 | 50 | 3-(trimethoxysilyl)-2-(p,m-chloromethyl)-phenylethane | Toluene, IPA, reflux | 90% | 1.47 |
| 8 | 50 | 3-(trimethoxysilyl)-2-(p,m-chloromethyl)-phenylethane | Toluene, IPA, reflux | 90% | 4.33 |
| 9 | 50 | 3-(N-styrylmethyl-2-aminoethylamino)-propyltrimethoxysilane hydrochloride | Toluene, IPA, reflux | 32% | 13.30 |
| 10 | 50 | 3-(N-styrylmethyl-2-aminoethylamino)-propyltrimethoxysilane hydrochloride | Toluene, IPA, reflux | 32% | 4.99 |
| 11 | 50 | N-trimethoxysilylpropyl-N,N,N-trimethylammonium chloride | Toluene, IPA, reflux | 50% | 7.32 |
| 12 | 50 | N-trimethoxysilylpropyl-N,N,N-trimethylammonium chloride | Toluene, IPA, reflux | 50% | 2.49 |
| 13 | 50 | 3-(N-styrylmethyl-2-aminoethylamino)-propyltrimethoxysilane hydrochloride | Toluene, IPA, reflux | 40% | 6.69 |
| 14 | 50 | 3-(N-styrylmethyl-2-aminoethylamino)-propyltrimethoxysilane hydrochloride | Toluene, IPA, reflux | 40% | 19.67 |
| 17 | 100 | 3-aminopropyltrimethoxysilane | Toluene, IPA, reflux | 100% | 7.52 |
| 18 | 100 | 3-aminopropyltrimethoxysilane | Toluene, IPA, reflux | 100% | 2.56 |
| 19 | 100 | N-(2-aminoethyl)-3-aminopropyltrimethoxysilane | Toluene, IPA, reflux | 97% | 9.62 |
| 20 | 100 | N-(2-aminoethyl)-3-aminopropyltrimethoxysilane | Toluene, IPA, reflux | 97% | 3.27 |
| 21 | 50 | Phenyldimethylethoxysilane | Toluene, IPA, reflux | 100% | 1.82 |
| 22 | 50 | Phenyldimethylethoxysilane | Toluene, IPA, reflux | 100% | 0.76 |
| 23 | 50 | 3-(trimethoxysilyl)propyl methacrylate | Toluene, IPA, reflux | 98% | 7.66 |
| 24 | 50 | N-(triethoxysilylpropyl)urea | Toluene, IPA, reflux | 49% | 5.44 |
| 25 | 50 | Trimethoxysilylpropyldiethylenetriamine | Toluene, IPA, reflux | 98% | 2.73 |
| 26 | 50 | Bis(2-hydroxyethyl)-3-aminopropyltriethoxysilane | Toluene, IPA, reflux | 58% | 4.96 |
| 27 | 50 | N-[3-(triethoxysilyl)propyl]imidazole | Toluene, IPA, reflux | 96% | 2.88 |

Example 2

Preparation of Different Types of Treated Silica Filter Media

Additional substrates, namely high carbon rice hull ash, different types of ultra pure diatomaceous earth (Celpure P1000, Celpure P65), Celite 545 (standard diatomaceous earth filter aid), Perlite, and LRA II (a non-silica based lipid adsorbent) were used. Table 2 summarizes the treatment conditions and compositions of these samples.

TABLE 2

Compositions and conditions of treatments of different substrates

| Silica Sample # | Substrate Media Type | Silica Amount g | Treatment Type | Treatment Condition | Silane Purity % | Loading (X Monolayer coverage) | Added Silane g |
|---|---|---|---|---|---|---|---|
| 28 | AgriSilicas STD | 150 | AEAPTMS (A 0700) | Toluene, IPA, reflux | 97% | 150% | 10.53 |

TABLE 2-continued

Compositions and conditions of treatments of different substrates

| Silica Sample # | Substrate Media Type | Silica Amount g | Treatment Type | Treatment Condition | Silane Purity % | Loading (X Monolayer coverage) | Added Silane g |
|---|---|---|---|---|---|---|---|
| 29 | Celpure P1000 | 100 | AEAPTMS (A 0700) | Toluene, IPA, reflux | 97% | 180% | 0.51 |
| 30 | Celpure P1000 | 50 | AEAPTMS (A 0700) | Toluene, IPA, reflux | 97% | 1070% | 1.53 |
| 31 | Celpure P1000 | 50 | Z-6032 (SMAEAPTMS) | Toluene, IPA, reflux | 32% | 200% | 1.46 |
| 32 | Perlite | 50 | AEAPTMS (A 0700) | Toluene, IPA, reflux | 97% | 200% | 0.24 |
| 33 | Perlite | 50 | Z-6032 (SMAEAPTMS) | Toluene, IPA, reflux | 32% | 200% | 1.21 |
| 34 | Celite 545 | 50 | AEAPTMS (A 0700) | Toluene, IPA, reflux | 97% | 200% | 0.40 |
| 35 | Celite 545 | 50 | Z-6032 (SMAEAPTMS) | Toluene, IPA, reflux | 32% | 200% | 2.05 |
| 36 | Celpure P65 | 50 | AEAPTMS (A 0700) | Toluene, IPA, reflux | 97% | 200% | 0.61 |
| 37 | Celpure P65 | 50 | Z-6032 (SMAEAPTMS) | Toluene, IPA, reflux | 32% | 200% | 3.13 |
| 38 | LRA II | 50 | AEAPTMS (A 0700) | Toluene, IPA, reflux | 97% | 120% | 8.96 |
| 39 | LRA II | 50 | Z-6032 (SMAEAPTMS) | Toluene, IPA, reflux | 32% | 120% | 45.80 |

Z-6032: 3-(N-styrylmethyl-2-aminoethylamino)-propyltrimethoxysilane hydrochloride
AEAPTMS: N-(2-aminoethyl)-3-aminopropyltrimethoxysilane Example 3

Two-step Process to Synthesize Hydrophilic Quaternary Ammonium Functional Filter Aids (Filter Media Samples 40 and 42)

The treatment equipment was composed of a 500 milliliter, 3-neck round bottom reaction flask, a Teflon shaft mechanic stirrer, thermometer, condenser, and heating mantle around the flask. The reaction flask was loaded with 50 g of amino-functional pretreated RHA (sample 17 or 19) silica filter media, and 200 ml IPA solvent. The mixture was stirred for few minutes at ambient temperature, then the surface modification process involved addition of the proper amount of glycidyltrimethylammonium chloride (2.46 g for sample 17, or 2.02 g for sample 19) directly to the mixture in a slow addition rate, while good mixing was maintained. The reaction mixture was heated and refluxed under a $N_2$ blanket. After 4 hours stirring and refluxing, the treated slurry mixture was allowed to cool. Then it was transferred to a porcelain Büchner funnel outfitted with Whatman filter paper, and attached to a vacuum filter flask. The treated filter cake was filtered and washed four times with about 150 ml of DI water each time. Afterward, the sample was dried in the hood for about 24 hours. Next the treated silica filter media was transferred to a Pyrex container and covered with a paraffin film having a number of holes made with a syringe needle, and then the sample was vacuum oven dried at 60° C. for 2-4 hours. The dried samples were analyzed for surface area, pores structure, carbon-hydrogen-nitrogen content, $^{29}Si$ NMR.

Example 4

Two-step Process to Synthesize Hydrophilic Sulphonate-Functional Filter Aids (Filter Media Sample 41)

The treatment equipment was composed of a 500 milliliter, 3-neck round bottom reaction flask, a Teflon shaft mechanic stirrer, thermometer, condenser, and heating mantle around the flask. The reaction flask was loaded with 50 g of epoxy-functional pretreated RHA silica filter media (sample 15), and 200 ml IPA:$H_2O$ (5:1) solvent. The mixture was stirred for few minutes at ambient temperature, and the reaction mixture heated up to 70° C. under a $N_2$ blanket. The surface modification process involved addition of the mixture of 0.55 g of sodium metabisulfite, 0.07 g of sodium sulfite catalyst, and 5 g water from an additional funnel directly to the mixture in a slow addition rate over 1-2 hours, while good mixing was maintained. The temperature was then raised up to approximately 80° C., until the reaction completed. The reaction was monitored by iodometric titration of residual $NaHSO_3$. After approximately 22 hours stirring and refluxing, the treated slurry mixture was allowed to cool. Then it was transferred to a porcelain Büchner funnel outfitted with Whatman filter paper, and attached to a vacuum filter flask. The treated filter cake was filtered and washed four times with about 150 ml of DI water each time. Afterward, the sample was dried in the hood for about 24 hours. Next the treated filter aid was transferred to a Pyrex container and covered with a paraffin film having a number of holes made with a syringe needle, and then the sample was vacuum oven dried at 60° C. for 2-4 hours. The dried samples were analyzed for surface area, pores structure, carbon-hydrogen-nitrogen content, $^{29}Si$ NMR. Table 3 summarizes compositions and conditions of the two-step processes.

TABLE 3

Compositions and conditions of treatments of two step processes.

| Sample # | Silica Amount g | 2nd Step Reactant | Treatment Condition | Silane Purity % | Added Silane g |
|---|---|---|---|---|---|
| 40 | 50 | Glycidyltrimethylammonium chloride | IPA, reflux | 75% | 2.02 |
| 41 | 50 | $Na_2S_2O_5/Na_2SO_3$ | IPA, water, reflux | 100% | 0.55/0.07 |
| 42 | 50 | Glycidyltrimethylammonium chloride | IPA, reflux | 75% | 2.46 |

Characterization of the Treated Silica Filter Media: BET Surface Area, Pore Volume, Pore Diameter The surface area and porosity were measured using a Micrometrics® ASAP 2010 analyzer. Before analyses, the samples were degassed under vacuum at 150° C. until a constant pressure was achieved. In the analysis step, $N_2$ gas was adsorbed by the sample at 77° K. and the surface area was calculated from the volume of adsorbate. BET parameters were acquired by integration of the BET equation using ASAP-2010 software. Surface area was calculated in the range of $0.05 \leq P/Po \leq 0.3$ from the adsorption branch of the isotherm. Barrett-Joyner-Halenda analysis was used to calculate the pore volume and pore diameter.

NMR

Identification of specific functional groups and molecular structure was determined by $^{29}Si$ solid state NMR spectroscopy on a Unity Plus 400 MHz Spectrometer using a Varian VT CPMAS probe and a 7 mm motor.

Carbon-Hydrogen-Nitrogen (CHN)

CHN content was determined by combustion technique at Robertson Microlit Laboratories. From this analysis information, the treatment level on the surface was calculated.

Table 4 summarizes the characterization data of the treated silica samples.

TABLE 4

Characterization data summary of treated silica samples

| Sample # | Moisture content % | Surface Area $m^2/g$ | Pore Volume $cm^3/g$ | Pore Diameter Å | % C by Robertson Microlit | Ligand density $\mu mol/m^2$ | $\mu mol/g$ |
|---|---|---|---|---|---|---|---|
| 1 | 2.63% | 8.69 | 0.047 | 149.54 | 5.69% | 23.73 | 206.16 |
| 2 | 4.43% | 11.58 | 0.060 | 142.22 | 5.58% | 17.47 | 202.17 |
| 3 | 2.05% | 17.85 | 0.077 | 98.42 | 5.12% | 10.39 | 185.51 |
| 4 | 1.60% | 22.51 | 0.097 | 97.05 | 3.11% | 4.61 | 103.67 |
| 5 | 1.43% | 23.45 | 0.098 | 93.15 | 2.96% | 4.57 | 107.25 |
| 6 | 1.89% | 24.53 | 0.104 | 94.57 | 2.47% | 3.36 | 82.33 |
| 7 | 1.57% | 32.65 | 0.128 | 99.68 | 0.84% | 1.95 | 63.64 |
| 8 | 2.60% | 33.66 | 0.129 | 99.64 | 1.01% | 2.27 | 76.52 |
| 9 | 2.20% | 22.98 | 0.101 | 105.56 | 2.19% | 4.96 | 114.06 |
| 10 | 1.46% | 29.32 | 0.118 | 96.80 | 1.32% | 2.35 | 68.75 |
| 11 | 1.33% | 30.24 | 0.124 | 100.45 | 1.67% | 5.75 | 173.96 |
| 12 | 1.44% | 22.39 | 0.103 | 112.07 | 0.88% | 4.09 | 91.67 |
| 13 | 1.59% | 28.19 | 0.112 | 95.47 | 2.09% | 3.86 | 108.85 |
| 14 | 1.77% | 18.76 | 0.077 | 101.39 | 2.98% | 8.27 | 155.21 |
| 17 | 2.71% | 28.02 | 0.100 | 97.28 | 1.36% | 8.09 | 226.67 |
| 18 | 0.86% | 30.48 | 0.118 | 100.00 | 0.72% | 3.94 | 120.00 |
| 19 | 1.49% | 23.64 | 0.101 | 101.93 | 1.68% | 8.46 | 200.00 |
| 20 | 1.75% | 28.15 | 0.118 | 98.55 | 1.03% | 4.36 | 122.62 |
| 21 | 1.44% | 32.32 | 0.131 | 102.99 | 0.42% | 1.35 | 43.75 |
| 22 | 2.47% | 32.28 | 0.133 | 104.50 | 0.23% | 0.74 | 23.96 |
| 23 | 0.80% | 29.80 | 0.120 | 97.08 | 0.98% | 3.04 | 90.74 |
| 24 | 1.05% | 28.99 | 0.119 | 100.14 | 0.80% | 2.87 | 83.33 |
| 25 | 2.06% | 27.02 | 0.117 | 100.15 | 1.14% | 3.91 | 105.56 |
| 26 | 0.96% | 31.75 | 0.128 | 100.93 | 0.74% | 1.77 | 56.06 |
| 27 | 1.63% | 31.06 | 0.129 | 102.94 | 0.62% | 1.66 | 51.67 |
| 28 | 2.90% | 16.11 | 0.023 | 215.71 | 0.82% | 6.06 | 97.62 |
| 29 | 0.33% | 2.18 | 0.002 | 106.61 | 0.09% | 4.92 | 10.71 |
| 31 | 0.04% | 2.39 | 0.003 | 140.36 | 0.46% | 10.02 | 23.96 |
| 33 | 5.68% | 3.07 | 0.003 | 148.64 | 0.57% | 9.66 | 29.69 |
| 34 | 0.48% | 1.47 | 0.002 | 104.07 | 0.16% | 12.94 | 19.05 |
| 35 | 0.05% | 2.11 | 0.002 | 139.39 | 0.22% | 5.42 | 11.46 |
| 37 | 0.94% | 5.66 | 0.014 | 145.31 | 0.39% | 3.59 | 20.31 |
| 39 | 5.31% | 112.73 | 0.741 | 222.48 | 8.71% | 4.02 | 453.65 |
| 40 | 2.77% | 21.82 | 0.099 | 105.43 | 1.82% | 5.35 | 116.67 |
| 41 | 2.69% | 29.02 | 0.114 | 98.12 | 0.99% | 3.55 | 103.13 |
| 42 | 1.91% | 26.17 | 0.109 | 102.99 | 1.41% | 4.08 | 106.82 |

Example 5

Compositions and Treatment Conditions of Silica Filters and their Characterization Table 5A-5C summarized additional compositions and treatment conditions of rice hull ash and their characterization.

TABLE 5A

| Filter Media Sample No | Treatment Type | Silica Type | Silica gram | First Additive Name | First Additive Gram | Second Additive Name | Second Additive Gram | Reagent gram Glycidyl-trimethyl-ammonium chloride | Results % C % | Results Ligand Density μmol/m² |
|---|---|---|---|---|---|---|---|---|---|---|
| 43 | 3-(N-styrylmethyl-2-aminoethylamino)-propyltrimethoxy-silane hydrochloride | Producers RHA | 25 | 3-(N-styrylmethyl-2-aminoethylamino)-propyltrimethoxy-silane hydrochloride | 19.83 | | | | 5.61% | 25.68 |
| 44 | 3-(Trimethoxysilyl propyl) isothiouronium chloride | Producers RHA | 25 | 3-(Trimethoxysilyl propyl) isothiouronium chloride | 3.88 | | | | 1.06% | 11.34 |
| 45 | 3-(Trimethoxysilyl-propyl) isothiouronium chloride | Producers RHA | 25 | 3-(Trimethoxysilylpropyl) isothiouronium chloride | 3.88 | | | | 1.67% | 18.27 |
| 46 | N-Octadecyldimethyl (3-Trimethoxysilyl propyl) ammonium chloride, then N-(Triethoxysilyl-propyl)-o-polyethylene oxide urethane | RiceSil 100 | 500 | N-Octadecyldimethyl(3-Trimethoxysilylpropyl) ammonium chloride | 93.29 | N-(Triethoxysilyl-propyl)-o-polyethylene oxide urethane | 4.12 | | 2.46% | 5.41 |
| 47 | 3-(N-styrylmethyl-2-aminoethylamino)-propyl trimethoxysilane hydrochloride, then N-(Triethoxysilylpropyl)-o-polyethylene oxide urethane | RiceSil 100 | 500 | 3-(N-styrylmethyl-2-aminoethylamino)-propyltrimethoxysilane hydrochloride | 92.66 | N-(Triethoxysilyl-propyl)-o-polyethylene oxide urethane | 3.12 | | 1.96% | 6.37 |
| 48 | 3-(N-styrylmethyl-2-aminoethylamino)-propyltrimethoxy-silane hydrochloride | RiceSil 100 | 500 | 3-(N-styrylmethyl-2-aminoethylamino)-propyltrimethoxy-silane hydrochloride | 185.33 | | | | 4.16% | 40.42 |
| 49 | 3-(Trimethoxysilylpropyl) isothiouronium chloride | RiceSil 100 | 25 | 3-(Trimethoxysilyl-propyl) isothiouronium chloride | 3.88 | | | | 1.90% | 24.60 |
| 50 | N-(2-Aminoethyl)-3-amino-propyltrimethoxysilane, plus Glycidyltrimethyl-ammonium chloride | RiceSil 100 | 500 | N-(2-Aminoethyl)-3-aminopropyltrimethoxy-silane | 43.42 | | | 23.47 | 2.53% | 16.35 |
| 51 | 3-(Trihydroxysilylpropyl-methylphosphonate) sodium salt | RiceSil 100 | 200 | 3-(Trihydroxysilylpropyl-methylphosphonate) sodium salt | 21.53 | | | | 1.00% | 6.75 |
| 52 | N-Octadecyldimethyl(3-Trimethoxysilylpropyl) ammonium chloride | RiceSil 100 | 500 | N-Octadecyldimethyl(3-Trimethoxysilylpropyl) ammonium chloride | 9.33 | | | | 0.68% | 0.90 |

TABLE 5A-continued

| Filter Media Sample No | Treatment | Silica Type | Silica gram | First Additive Name | First Additive Gram | Second Additive Name | Second Additive Gram | Glycidyltrimethylammonium chloride | % C | Ligand Density μmol/m² |
|---|---|---|---|---|---|---|---|---|---|---|
| 53 | N-(Trimethoxysilylpropyl) ethylenediamine, triacetic acid, trisodium salt | RiceSil 100 | 500 | N-(Trimethoxysilylpropyl) ethylenediamine, triacetic acid, trisodium salt | 5.80 | | | | 1.50% | 12.53 |

TABLE 5B

| Sample # | Silica g | Silane Type | Treatment condition | Silane Purity % | Added Silane g | % C | Ligand Density |
|---|---|---|---|---|---|---|---|
| 54 | 500 | trimethoxysilylpropyl-ethylenediamine, triacetic acid, trisodium salt | Toluene, Reflux, H₂O | 45.0 | 72.46 | 1.86 | 4.79 |
| 55 | 500 | N-(triethoxysilylpropyl)-O-polyethylene oxide urethane | Toluene, Reflux, H₂O | 95.0 | 59.68 | 2.34 | 4.39 |
| 56 | 500 | Bis-(2-hydroxyethyl)-3-aminopropyltriethoxysilane | Toluene, Reflux, H₂O | 57.6 | 22.55 | 0.93 | 1.26 |
| 57 | 500 | ((chloromethyl)phenylethyl)trimethoxy silane | Toluene, Reflux, H₂O | 90.0 | 8.70 | 1.05 | 1.55 |
| 58 | 500 | N-(3-triethoxysilylpropyl)-gluconamide | Toluene, Reflux, H₂O | 50.0 | 31.64 | 1.12 | 2.1 |
| 59 | 500 | 3-mercaptopropyltriethoxysilane | Toluene, Reflux, H₂O | 95.0 | 9.95 | 0.81 | 3.59 |
| 60 | 500 | N-(triethoxysilylpropyl)-4-hydroxybutyramide | Toluene, Reflux, H₂O | 100.0 | 12.16 | 1.16 | 0.21 |
| 61 | 500 | 3-(triethoxysilyl)propylsuccinic anhydride | Toluene, Reflux, H₂O | 95.0 | 12.73 | 0.76 | 1.46 |
| 62 | 500 | Tris(3-trimethoxysilylpropyl)isocyanurate | Toluene, Reflux, H₂O | 95.0 | 34.18 | 1.28 | 2.13 |
| 63 | 500 | 2-Hydroxy-4-(3-triethoxysilylpropoxy)-diphenylketone | Toluene, Reflux, H₂O | 95.0 | 23.23 | 1.61 | 1.74 |
| 64 | 500 | Ureidopropyltrimethoxysilane | Toluene, Reflux, H₂O | 100.0 | 11.72 | 0.86 | 2.03 |
| 65 | 500 | 3-isocyanatopropyltriethoxysilane | Toluene, Reflux, H₂O | 95.0 | 6.90 | 0.81 | 5.31 |
| 66 | 500 | N-(3-trimethoxysilylpropyl)pyrrole | Toluene, Reflux, H₂O | 100.0 | 6.08 | 0.87 | 3.26 |
| 67 | 500 | Bis[(3-methyldimethoxysilyl)propyl]-polypropylene oxide | Toluene, Reflux, H₂O | 100.0 | 18.92 | 1.72 | 1.4 |

TABLE 5C

| Sample # | Silane Type | Treatment condition | Ricesil 100 Weight gram | Silane Purity % | Silane Weight gram | % C Robertson Microlit | Ligand Density Calculated umol/m2 |
|---|---|---|---|---|---|---|---|
| 68 | trimethoxysilylpropyl-ethylenediamine, triacetic acid, trisodium salt | Toluene, Reflux, H₂O | 500 | 45% | 24.20 | 1.08 | 1.27 |
| 69 | N-trimethoxysilylpropyl-N,N,N—Cl, trimethylammonium chloride | Toluene, Reflux, H₂O | 500 | 50% | 14.60 | 0.79 | 1.28 |
| 70 | 2-(4-chlorosulfonylphenyl)-ethyltrichlorosilane | Toluene, Reflux, H₂O | 500 | 50% | 24.20 | 1.28 | 2.89 |
| 71 | 3-(N-styrylmethyl-2-aminoethylamino)-propyltrimethoxysilane hydrochloride | Toluene, Reflux, H₂O | 500 | 32% | 46.30 | 1.65 | 4.69 |
| 72 | triethoxysilylpropylethyl-carbamate | Toluene, Reflux, H₂O | 500 | 100% | 12.35 | 1.01 | 1.60 |
| 73 | N-(triethoxysilylpropyl)-O-polyethylene oxide urethane | Toluene, Reflux, H₂O | 500 | 95% | 19.94 | 1.09 | 1.01 |

TABLE 5C-continued

| Sample # | Silane Type | Treatment condition | Ricesil 100 Weight gram | Silane Purity % | Silane Weight gram | % C Robertson Microlit | Ligand Density Calculated umol/m2 |
|---|---|---|---|---|---|---|---|
| 74 | 3-trihydrosilylpropylmethylphosphonate, sodium salt | Toluene, Reflux, $H_2O$ | 500 | 42% | 22.45 | 0.83 | 2.82 |
| 75 | Bis-(2-hydroxyethyl)-3-aminopropyltriethoxysilane | Toluene, Reflux, $H_2O$ | 500 | 58% | 22.55 | 0.93 | 1.26 |
| 76 | N-(3-triethoxysilylpropyl)-4,5-dihydroimidazole | Toluene, Reflux, $H_2O$ | 500 | 96% | 12.06 | 1 | 1.57 |
| 77 | ((chloromethyl)phenylethyl)trimethoxysilane | Toluene, Reflux, $H_2O$ | 500 | 90% | 8.70 | 1.05 | 1.55 |
| 78 | 3-aminopropyltrimethoxysilane, then N-(triethoxysilylpropyl)-O-polyethylene oxide urethane | Toluene, Reflux, $H_2O$ | 500 | 81% 95% | 8.15 5.03 | 0.99 | 2.58 |
| 79 | 3-trihydrosilylpropylmethylphosphonate, sodium salt, then N-(triethoxysilylpropyl)-O-polyethylene oxide urethane | Toluene, Reflux, $H_2O$ | 500 | 42% 95% | 16.87 5.02 | 0.77 | 2.43 |
| 80 | N-trimethoxysilylpropyl-N,N,N—Cl, trimethylammonium chloride, then (3-glycidoxypropyl)trimethoxysilane | Toluene, Reflux, $H_2O$ | 500 | 50% 100% | 15.30 2.40 | 0.95 | 2.41 |
| 81 | 3-trihydrosilylpropylmethylphosphonate, sodium salt, then Bis-(2-hydroxyethyl)-3-aminopropyltriethoxysilane | Toluene, Reflux, $H_2O$ | 500 | 42% 58% | 16.90 5.31 | 0.98 | 3.81 |
| 82 | 3-(N-styrylmethyl-2-aminoethylamino)-propyltrimethoxysilane hydrochloride, then N-(triethoxysilylpropyl)-O-polyethylene oxide urethane | Toluene, Reflux, $H_2O$ | 500 | 32% 95% | 34.76 5.04 | 1.72 | 4.95 |
| 83 | 2-(trimethoxysilylethyl)pyridine | Toluene, Reflux, $H_2O$ | 500 | 100% | 9.01 | 1.17 | 2.89 |
| 84 | N-(3-triethoxysilylpropyl)-gluconamide | Toluene, Reflux, $H_2O$ | 500 | 50% | 31.64 | 1.12 | 2.10 |
| 85 | 2-(trimethoxysilylethyl)pyridine, then N-(3-triethoxysilylpropyl)-gluconamide | Toluene, Reflux, $H_2O$ | 500 | 100% 50% | 6.74 7.90 | 1.04 | 2.40 |
| 86 | 3-mercaptopropyltriethoxysilane | Toluene, Reflux, $H_2O$ | 500 | 95% | 9.95 | 0.81 | 3.59 |
| 87 | N-trimethoxysilylpropyl-N,N,N—Cl, trimethylammonium chloride, then N-(3-triethoxysilylpropyl)-gluconamide | Toluene, Reflux, $H_2O$ | 500 | 50% 50% | 15.30 7.95 | 0.98 | 2.54 |
| 88 | N-(triethoxysilylpropyl)-4-hydroxybutyramide | Toluene, Reflux, $H_2O$ | 500 | 100% | 12.16 | 1.16 | 0.21 |
| 89 | 3-(triethoxysilyl)propylsuccinic anhydride | Toluene, Reflux, $H_2O$ | 500 | 95% | 12.73 | 0.78 | 1.42 |
| 90 | Trimethoxysilylpropyl polyethyleneimine | Toluene, Reflux, $H_2O$ | 50 | 50% | 1.00 | 1.04 | 1.43 |
| 91 | Tris(3-trimethoxysilylpropyl)isocyanurate | Toluene, Reflux, $H_2O$ | 500 | 95% | 34.18 | 1.28 | 1.60 |
| 92 | 2-Hydroxy-4-(3-triethoxysilylpropoxy)-diphenylketone | Toluene, Reflux, $H_2O$ | 500 | 95% | 23.23 | 1.61 | 1.74 |
| 93 | Ureidopropyltrimethoxysilane | Toluene, Reflux, $H_2O$ | 500 | 100% | 11.72 | 0.86 | 2.03 |
| 94 | O-(propargyloxy)-N-(triethoxysilylpropyl)urethane | Toluene, Reflux, $H_2O$ | 500 | 90% | 17.77 | 1.04 | 1.84 |
| 95 | 3-(trimethoxysilyl)propyloctadecyldimethylammonium chloride | Toluene, Reflux, $H_2O$ | 500 | 42% | 9.33 | 0.21 | 0.24 |
| 96 | N-1-phenylethyl-N'-triethoxysilylpropylurea | Toluene, Reflux, $H_2O$ | 500 | 100% | 9.70 | 1.02 | 2.43 |
| 97 | 3-isocyanatopropyltriethoxysilane | Toluene, Reflux, $H_2O$ | 500 | 95% | 6.90 | 0.81 | 5.31 |
| 98 | 2-(3,4-epoxycyclohexyl)ethyltrimethoxysilane | Toluene, Reflux, $H_2O$ | 500 | 97% | 6.90 | 0.98 | 3.22 |
| 99 | N-(3-trimethoxysilylpropyl)pyrrole | Toluene, Reflux, $H_2O$ | 500 | 100% | 6.08 | 0.87 | 3.26 |

TABLE 5C-continued

| Sample # | Silane Type | Treatment condition | Ricesil 100 Weight gram | Silane Purity % | Silane Weight gram | % C Robertson Microlit | Ligand Density Calculated umol/m2 |
|---|---|---|---|---|---|---|---|
| 100 | Bis[(3-methyldimethoxysilyl)propyl]-polypropylene oxide | Toluene, Reflux, H$_2$O | 500 | 100% | 18.96 | 1.07 | 1.40 |
| 101 | N-trimethoxysilylpropyl-N,N,N—Cl, trimethylammonium chloride, then 2-Hydroxy-4-(3-triethoxysilylpropoxy)-diphenylketone | Toluene, Reflux, H$_2$O | 500 | 50% 95% | 10.34 3.12 | 0.84 | 3.67 |
| 102 | Trimethoxysilylpropylisothiouronium chloride | Toluene, Reflux, H$_2$O | 500 | 43% | 15.55 | 0.71 | 0.44 |
| 103 | (3-glycidoxypropyl)trimethoxysilane | Toluene, Reflux, H$_2$O | 500 | 100% | 6.23 | 0.74 | 0.35 |
| 104 | 3-mercaptopropyltriethoxysilane, then N-(triethoxysilylpropyl)-O-polyethylene oxide urethane | Toluene, Reflux, H$_2$O | 500 | 95% 95% | 4.98 3.38 | 0.79 | 1.14 |
| 105 | 3-(triethoxysilyl)propylsuccinic anhydride, then N-(triethoxysilylpropyl)-O-polyethylene oxide urethane | Toluene, Reflux, H$_2$O | 500 | 95% 95% | 6.36 3.40 | 0.94 | 1.05 |
| 106 | trimethoxysilylpropyl-ethylenediamine, triacetic acid, trisodium salt, then N-(triethoxysilylpropyl)-O-polyethylene oxide urethane | Toluene, Reflux, H$_2$O | 500 | 45% 95% | 20.35 3.45 | 1.16 | 1.64 |
| 107 | 2-(4-chlorosulfonylphenyl)-ethyltrichlorosilane, then N-(triethoxysilylpropyl)-O-polyethylene oxide urethane | Toluene, Reflux, H$_2$O | 500 | 50% 95% | 13.40 3.40 | 0.93 | 0.89 |
| 108 | 2-(4-chlorosulfonylphenyl)-ethyltrichlorosilane, then Bis-(2-hydroxyethyl)-3-aminopropyltriethoxysilane | Toluene, Reflux, H$_2$O | 500 | 50% 58% | 15.30 5.32 | 1.01 | 1.15 |

Ligand densities are corrected for 0.43% C due to residual carbon on the original rice hull ash. Mixed silanes sample ligand density are based on first silane.

Example 6

Surface Treated Rice Hull Ash for Protein Binding and Release Objective

To test the binding and release of protein using surface treated rice hull ash (RHA). The protein solution is particulate free, derived from *Micrococcus luteus* fermentation.

Table 6 summarizes the filter media samples and their surface treatments.

TABLE 6

| Sample Designation | Treatment |
|---|---|
| 6 | 3-(trimethoxysilyl)propyloctadecyl-dimethylammonium chloride treated RHA |
| 4 | 3-(trimethoxysilyl)propyloctadecyl-dimethylammonium chloride treated RHA |
| Unground RHA from Producers | Untreated |
| FW12 | Commercial diatomaceous earth (Eager Picher) |
| HQ50 | Commercial quaternary amine ion-exchange resin (PerSeptive BioSystems) |

Procedure 1. 2 g of each sample was measured into a 50-mL conical tube.
2. 25 mL of 25 mM Tris-HCL, pH 8.4 buffer was added.
3. Sample and buffer were mixed by inversion overnight.
4. Each of the wetted samples was transferred to a 15 mL conical tube, then centrifuged at 2500 g for 5 minutes and the supernatant was decanted. The resulting samples were used for binding test below.
5. Protein test solution description and preparation:
   Source: *Micrococcus luteus* particulate free concentrated broth recovered using the following steps:
   Fermentation broth was lysed using 200 ppm lysozyme (from chicken hen white).
   Lysed broth was flocculated using a poly-cationic polymer and filtered to remove particulates.
   Particulate broth was concentrated using an ultrafilter to dewater (Prep/Scale™ TFF, Millipore).
6. The above solution was adjusted with 24 parts of 25 mM Tris-HCl pH 8.4 buffer.
7. 5 mL of protein test solution was added to each tube containing surface treated rice hull ash.
8. The tubes were mixed by inversion for 90 min.
9. The mixed tubes were centrifuged at 2500 g for 5 minutes and the supernatant was decanted. The fraction collected is referred to as "Flow Through or FT".
10. 5 mL of 25 mM Tris-HCl pH 8.4 buffer was added to each of the tubes which were allowed to mix by inversion for 45 min.
11. The tubes were centrifuged at 2500 g for 5 min and the supernatant was decanted. The fraction collected is referred to as "Wash".
12. 5 mL elution buffer (25 mM Tris-HCl pH 8.4 containing 2M NaCl) was added and mixed for 30 min.
13. 0.5 mL of 0.5M NaOH was added to each tube.

14. The tubes were mixed by inversion for 90 min.
15. The tubes were centrifuged at 2500 g for 5 min and the supernatant was decanted. The fraction collected is referred to as "Eluate".
16. All the fractions were analyzed by SDS-PAGE gel electrophoresis (procedure according to NuPAGE Electrophoresis System, U.S. Pat. No. 5,578,180, by NOVEX electrophoresis GmbH, Germany).

Observations

FIG. 1A (Binding and Analysis of Unbound Components)

Unbound sample was detected by analysis of the Flow Through and the Eluate represents all or a portion of bound sample released in the elution process.

FW12 (commercial diatomaceous earth) did not bind any protein from the feed (lane #3 versus lane #2). The slightly lower intensity for all the bands is due to the dilution by the solution used to pre-wet the test sample.

Untreated RHA selectively bound a protein band above 6 kd and below 14.4 kd (lane #4 versus lane #2). The slightly lower intensity for all the bands is due to the dilution by the solution used to pre-wet the test sample.

HQ50 (commercial quaternary amine ion-exchange resin) bound most of the proteins from the test solution except below 14.4 kds (lane #5 versus lane #2)

Treated RHA Sample 4 selectively bound near and above 97 kd region, between 55.4 and 36.5 kd, near 21 kd and 14.4 kd proteins. Note that the bands below 14.4 kd were not captured, as in the case with HQ50. The overall protein band intensity appears lower than the untreated rice hull ash and FW12, which suggests greater binding by treated RHA.

Treated RHA Sample 6 demonstrated similar protein binding selectivity as sample 4 but appears to have lower binding capacity. Note that the bands below 14.4 kd were not captured, as in the case with HQ50. The overall protein band intensity appears lower than the untreated rice hull ash and FW12.

Figure 1B:
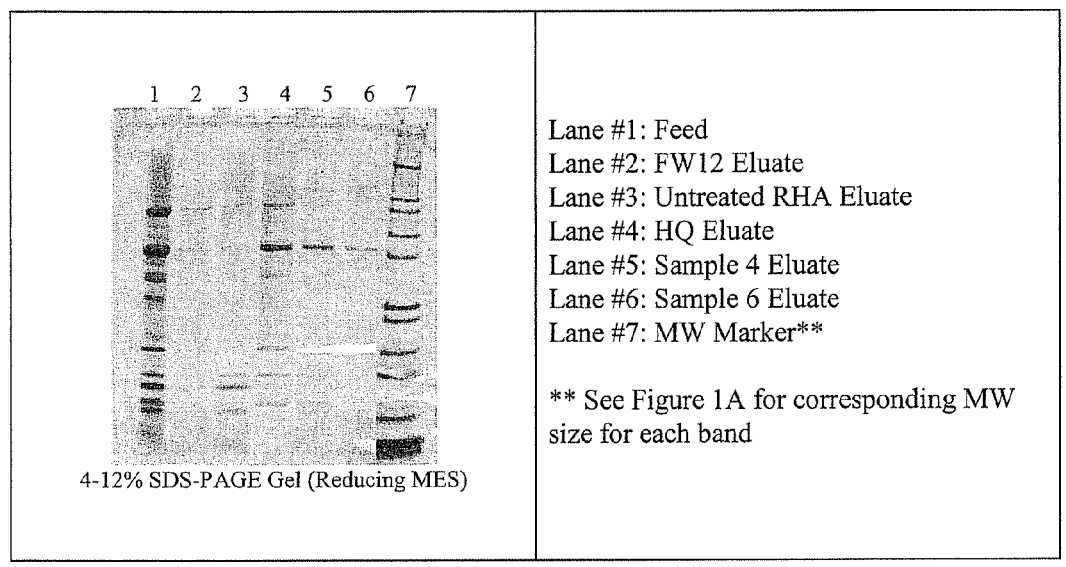
FIG. 1B shows protein release, to untreated diatomaceous earth (FW12), untreated rice hull ash, HQ50 (commercial quaternary amine anion exchange resin) and surface treated rice hull ashes (silica filter media samples 4 and 6).

FIG. 1B (Release and Analysis of Bound Components)

FW12 eluate contains trace amount of proteins which are most likely from the physically trapped/carried over liquid (lane #2).

The protein, below 14.4 and above 6 kd bands, bound to untreated RHA were released (lane #3)

All the proteins captured by HQ50 were released (lane #4)

Eluate from sample 4 contains protein bands above 116 kd, near and below 55 Kd and near 6 kd. The above 36.5 kd band appears to remain bound (lane #5).

Eluate from sample 6 contain mostly above 116 kd and near 55 kd bands. Others that were bound either remain bound or are too low to be detected by the analysis (lane #6).

Untreated diatomaceous earth did not exhibit protein-binding capability. The untreated rice hull ash demonstrated some protein binding capability. The two treated rice hull ashes, sample 4 and 6, demonstrate protein-binding capability.

Example 7

Surface Treated Rice Hull Ash for Protein Binding and Release

Objective

To test the binding and release of protein using additional surface treated rice hull ash. The protein solution is particulate free, derived from *Micrococcus luteus* fermentation.

Table 7 summarizes the filter media samples and their surface treatments.

TABLE 7

| Sample Designation | Treatment |
|---|---|
| 7 | 3-(trimethoxysilyl)-2-(p,m-chloromethyl)-phenylethane treated |
| 8 | 3-(trimethoxysilyl)-2-(p,m-chloromethyl)-phenylethane treated |
| 9 | 3-(N-styrylmethyl-2-aminoethylamino)-propyltrimethoxysilane hydrochloride treated |
| 10 | 3-(N-styrylmethyl-2-aminoethylamino)-propyltrimethoxysilane hydrochloride treated |
| 11 | N-trimethoxysilylpropyl-N,N,N-trimethylammonium chloride treated |
| 12 | N-trimethoxysilylpropyl-N,N,N-trimethylammonium chloride treated |

Procedure

Same as in Example 6.

Observations

Figure 2A:
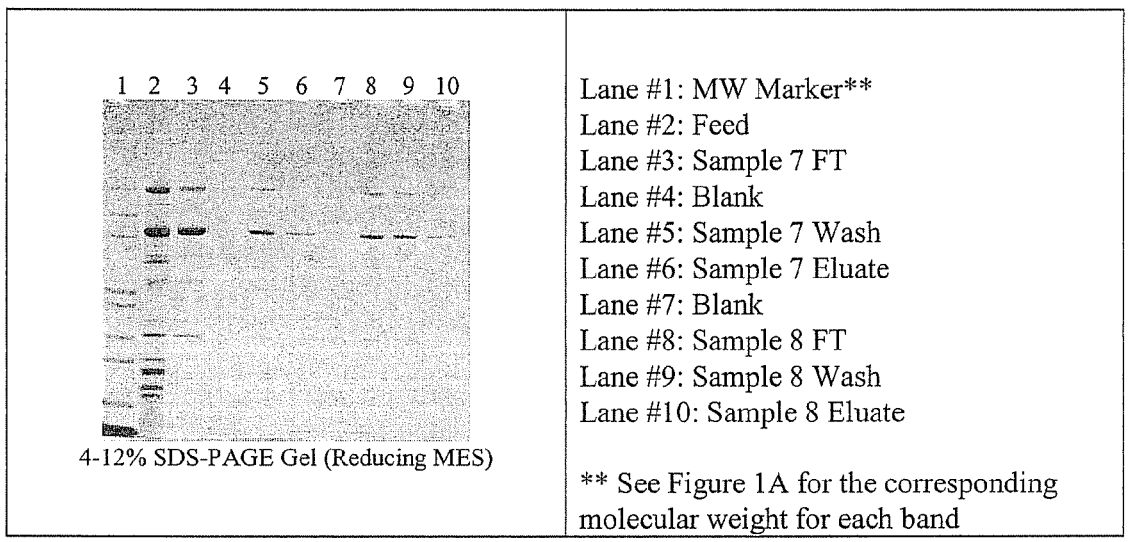
FIG. 2A shows the results of silica filter media samples 7 and 8.

Sample 7 Protein Binding and Release (FIG. 2A)

Selectively bound all MW bands below 55 kd except near 21.5 kd (lane 2 versus lane 3).

The wash has similar profile compared to flow through.

The eluate has a very light band near 55 kd, and not many other bands. The other bands appear to be tightly bound and were not eluted under conditions used.

Sample 8 Protein Binding and Release (FIG. 2A)

Similar observations as above, Sample 7.

Figure 2B:
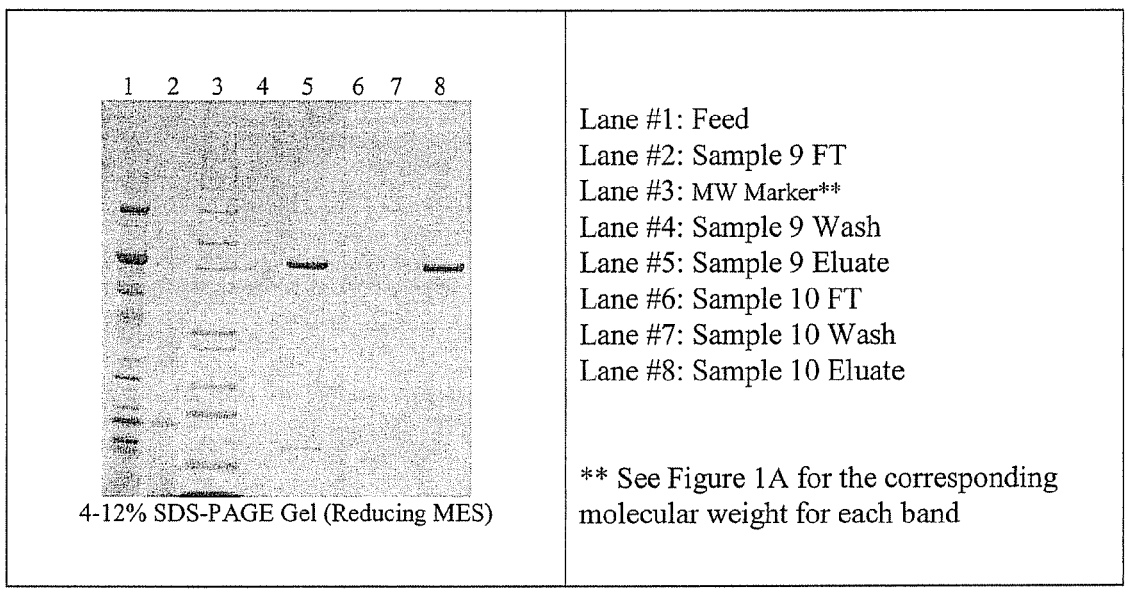
FIG. 2B shows the results of samples 9 and 10.

Sample 9 Protein Binding and Release (FIG. 2B)

Almost all the proteins were bound except for the band below 14 kd (lane 1 versus lane 2)

No protein bands were detected in the wash fraction.

Eluate fraction contained mostly near 55 kd band, other bands remain bound. This demonstrated selective release for the near 55 kd band resulting in a protein purity >90+% based on band intensity.

Sample 10 Protein Binding and Release (FIG. 2B)

Similar observations as the sample 9 above

Figure 2C:
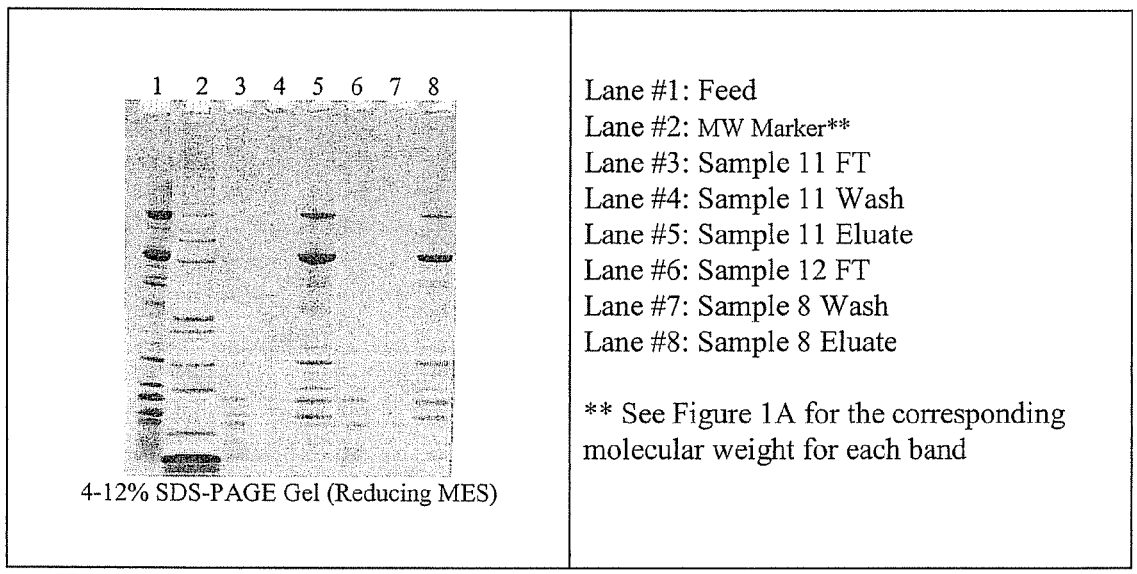
FIG. 2C shows the results of samples 11 and 12.

Sample 11 Protein Binding and Release (FIG. 2C)

Almost all, except some low MW bands, were bound. This demonstrated selective protein binding. (lane 1 versus lane 3)

No protein bands were detected in the wash fraction.

Most of the bands bound were eluted under conditions used (lane 5).

Appears to have relatively high binding capacity compared to other surface treated rice hull ashes.

Sample 12 Protein Binding and Release (FIG. 2C)

Similar Observations as the Sample 9 Above

Conclusions

Unique protein binding and release were observed for surface treated rice hull ashes. Selective binding was observed (Sample 7 and Sample 8). Selective release (sample 9 and sample 10) resulted in >90% protein purity fractions.

Example 8

Surface Treated Rice Hull Ash for Protein Binding and Release Objective

To test the binding and release of protein using additional surface treated rice hull ash. The experiment design is based on ion exchange. The protein solution is particulate free, derived from *Micrococcus luteus* fermentation.

Table 8 summarizes the filter media samples and their surface treatments.

TABLE 8

| Treated Rice Hull Ash Identification | Surface Treatment |
| --- | --- |
| 14 | 3-(N-styrylmethyl-2-aminoethylamino)-propyltrimethoxysilane hydrochloride treated |
| 13 | 3-(N-styrylmethyl-2-aminoethylamino)-propyltrimethoxysilane hydrochloride treated |
| 17 | 3-aminopropyltrimethoxysilane treated |
| 18 | 3-aminopropyltrimethoxysilane treated |
| 19 | N-(2-aminoethyl)-3-aminopropyltrimethoxysilane treated |
| 20 | N-(2-aminoethyl)-3-aminopropyltrimethoxysilane treated surface |

Procedure 1. 2 g of each surface treated rice hull ash was weighed into a 50 mL conical tube and 40 mL equilibration buffer (25 mM Tris-HCl pH 8.4) was added. The tubes were mixed by inversion for 30 min.
2. The tubes were centrifuged at 2500×g for 5 minutes and the supernatant was decanted.
3. Protein test solution source: *Micrococcus luteus* particulate free concentrated broth was prepared as in Example I followed by partial digestion using 10 ppm protease.
4. The above solution was adjusted with 24 parts of 25 mM Tris-HCl pH 8.4 buffer.
5. 20 mL of protein test solution was added to each prepared surface treated rice hull ash.
6. The samples were mixed by inversion for 30 min.
7. The samples were centrifuged at 2500×g for 5 minutes and the supernatant was decanted. The fraction collected is referred to as "Flow Through or FT"
8. 20 mL of 25 mM Tris-HCl pH 8.4 buffer was added to the samples which were allowed to mix by inversion for 15 min.
9. The samples were centrifuged at 2500×g for 5 min and the supernatant was decanted. The fraction collected is referred to as "Wash".
10. 20 mL elution buffer (25 mM Tris-HCl pH 8.4 containing 1M NaCl) was added to each sample and the samples were mixed by inversion for 30 min.
11. The samples were centrifuged at 2500×g for 5 min and the supernatant was decanted. The fraction collected is referred to as "Eluate #1"
12. Steps 9 and 10 were repeated using 10 mL of the same elution buffer+50 mM NaOH. The fraction collected is referred to as "Eluate #2".
13. All of the fractions were analyzed by SDS-PAGE gel electrophoresis.

Observations

Figure 3A:
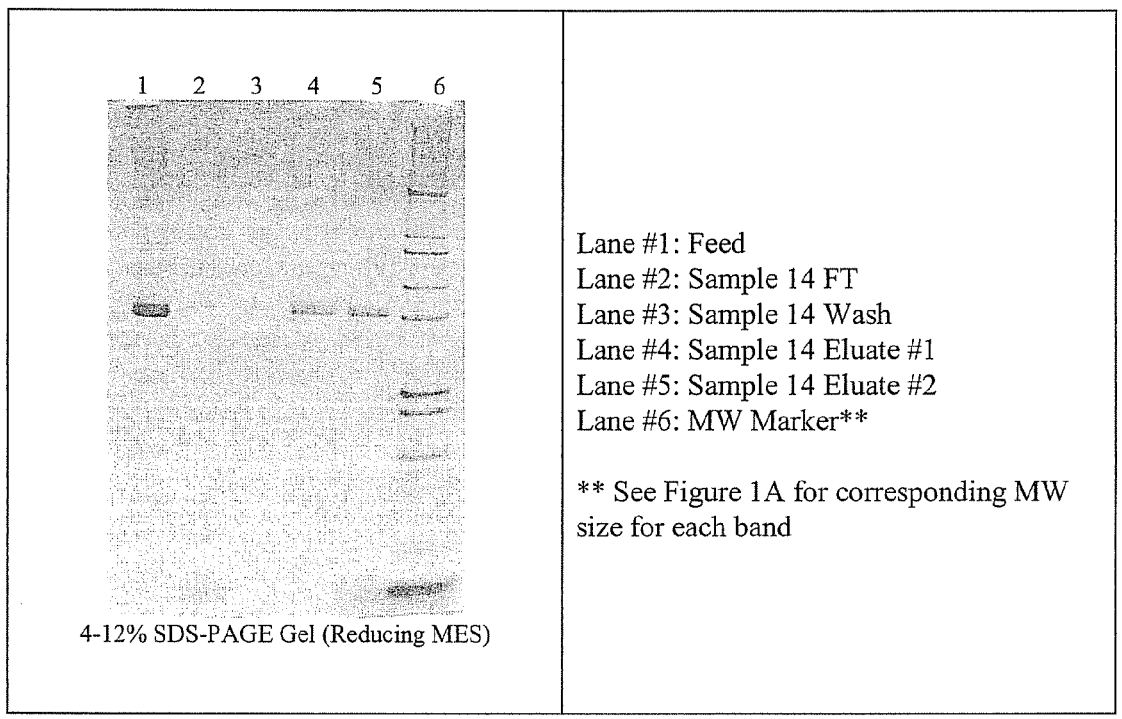
FIG. 3A shows the results of sample 14.

Sample 14 Protein Binding and Release (FIG. 3A)
    The flow through fraction has relatively low protein band intensity, which indicates sample 14 has relatively good binding capacity (lane #6 versus lane #1)
    The band below 14.4 kd remains in the flow through, which indicates selective binding.
    The bound proteins were partially eluted by 1M NaCl.
    Addition of NaOH to the 1M NaCl containing buffer further eluted the bound proteins.

Figure 3B:
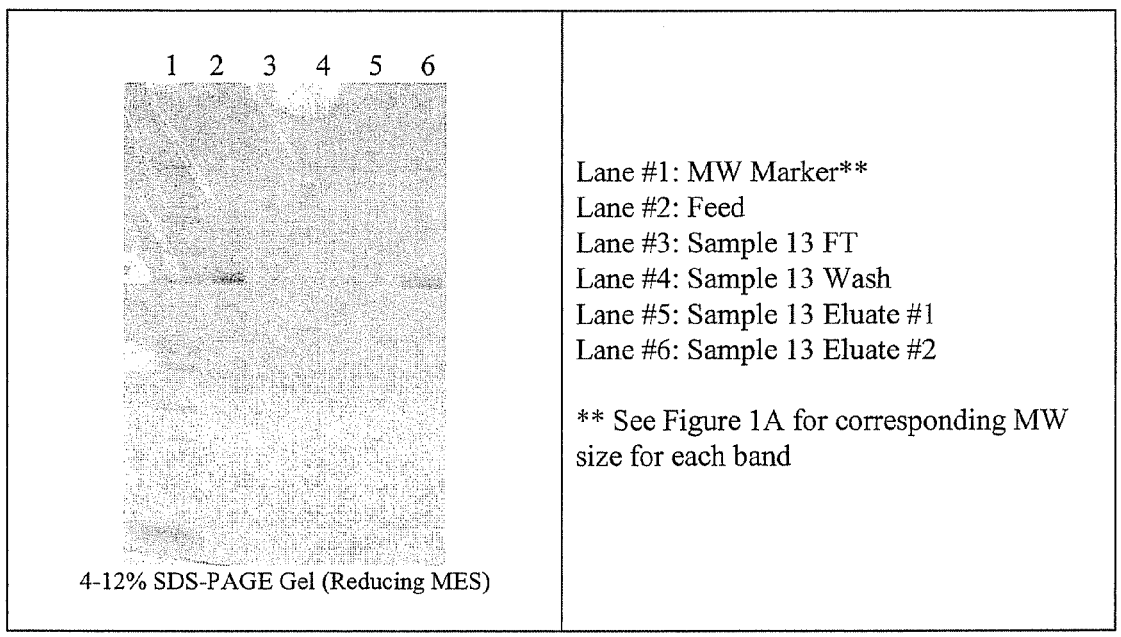
FIG. 3B shows the results of silica filter media samples 13 and 15.

Sample 13 Protein Binding and Release (FIG. 3B)
    All the feed proteins were bound (lane #3 versus lane #2)
    Only a small amount of bound protein was eluted at 1M NaCl (lane #5), which suggests that the binding may not be ion exchange.
    Addition of caustic to the 1M NaCl elution buffer successfully eluted bound protein.
    The behavior was similar to sample 14.

Sample 17 Protein Binding and Release (FIG. 3C)
    Relatively good binding as shown in lane #7 flow through fraction.
    Selectively did not bind the below 14 kd protein.
    Required high NaCl/NaOH for elution.

Sample 18 Protein Binding and Release (FIG. 3C)
    Relatively good binding as shown in lane #1 flow through fraction.
    Selectively did not bind the below 14 kd protein.
    Required high NaCl/NaOH for elution.
    The results are similar to those of sample 17.

Sample 19 Protein Binding and Release (FIG. 3D)
    Relatively good binding, as shown in the flow through fraction on lane #7 having low protein bands.
    Selectively did not bind the below 14 kd band.
    Most of the bound proteins were eluted at 1M NaCl.
    The addition of NaOH to 1M NaCl containing buffer further eluted the near 55 kd bands.

Figure 3E:
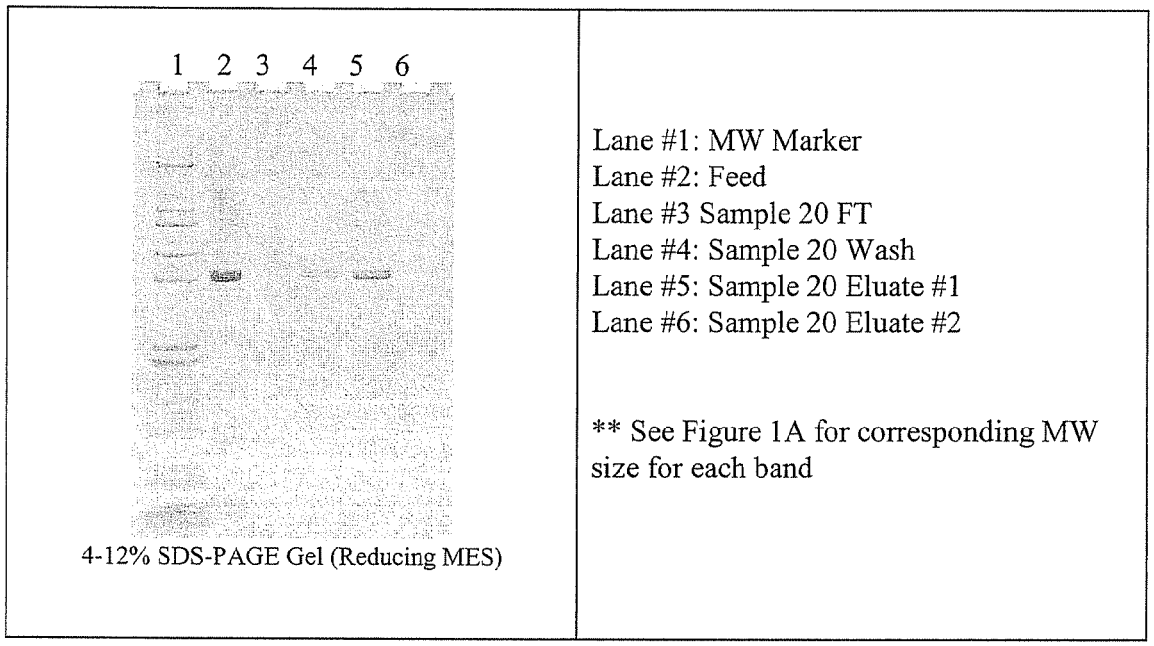
FIG. 3E shows the results of sample 20.

Sample 20 Protein Binding and Release (FIG. 3E)
    Relatively good binding as indicated by the low protein bands in the flow through fraction (lane #3).
    Some leakage during wash (lane #4).
    Selectively did not bind the below 14 kd band (lane #3).
    The bound proteins were eluted mostly at 1M NaCl (lane #5).
    The results are similar to those of sample 19.

Conclusions

For the above surface treated rice hull ash samples tested, three general binding/release behaviors were observed when the samples were tested under conditions suitable for binding based on anion exchange and release by high salt and/or high pH:

Relatively good binding, elute with NaCl/NaOH:

Sample 14 (3-(N-styrylmethyl-2-aminoethylamino)-propyltrimethoxysilane hydrochloride treated)

Sample 13 (3-(N-styrylmethyl-2-aminoethylamino)-propyltrimethoxysilane hydrochloride treated)

Sample 17 (3-aminopropyltrimethoxysilane treated)

Sample 18 (3-aminopropyltrimethoxysilane treated)

Relatively good binding, elute with NaCl:

Sample 19 (N-(2-aminoethyl)-3-aminopropyltrimethoxysilane treated)

Sample 20 (N-(2-aminoethyl)-3-aminopropyltrimethoxysilane treated)

The binding/release test was designed to test for anion exchange behavior. The observations are consistent with the RHA surface modifications.

The responses of sample 14 and sample 13 are consistent with a combination of ion exchange and hydrophobic characteristics.

Sample 17 and sample 18 also demonstrated a mixture of behaviors.

Sample 19 and sample 20 have typical characteristics similar to anion-exchange behavior in terms of both binding and release.

Example 9

Surface Treated Rice Hull Ash for Protein Binding and Release (Cation Exchange)

Objective

To test the binding and release of protein using surface treated rice hull ash. The protein solution is particulate free, derived from *Aspergillus niger* fermentation.

Table 9 summarizes the samples designation and their surface treatments.

TABLE 9

| Treated Rice Hull Ash Identification | Surface |
|---|---|
| 41 | $1^{st}$ step 3-glycidoxypropyltrimethoxysilane and $2^{nd}$ step $Na_2S_2O_5$ treatment |
| Unground RHA from Producers | Untreated |
| Porous HS50 | Commercial - SH cation exchange resin (PerSeptive BioSystems, Farmington, MA) |

Procedure 1. 2 g of each surface treated rice hull ash were placed into a 50 mL conical tube and 40 mL equilibration buffer (100 mM Sodium Acetate, pH 4.0) was added. The tubes were mixed by inversion for 30 min.
2. The tubes were centrifuged at 2500×g for 5 minutes and the supernatant was decanted.
3. Protein test solution description and preparation:
   a. Source: *Aspergillus niger* particulate free concentrated broth recovered using the following steps:
      i. The fermentation broth was filtered to remove cell.
      ii. Ultrafilter (dewater (Prep/Scale™ TFF, Millipore) cell free broth to dewater.
   b. The above solution was adjusted with 14 parts of 100 mM Sodium Acetate, pH 4.0 buffer.
4. 20 mL of protein test solution was added to each prepared surface treated rice hull ash.
5. The samples were mixed by inversion for 70 min.
6. The samples were centrifuged at 2500×g for 5 minutes and the supernatant was decanted. The fraction collected is referred to as "Flow Through or FT".
7. 20 mL of 100 mM Sodium Acetate pH 4.0 buffer was added to each sample, and the samples were allowed to mix by inversion for 15 min.
8. The samples were centrifuged at 2500×g for 5 min and the supernatant was decanted. The fraction collected is referred to as "Wash #1".
9. Steps 7 & 8 were repeated and the fraction collected is referred to as "Wash #2"
10. 20 mL elution buffer (100 mM Sodium Acetate pH 4.0 buffer containing 1M NaCl) was added and the samples were mixed by inversion for 60 min.
11. The samples were centrifuged at 2500 g for 5 min and the supernatant was decanted. The fraction collected is referred to as "Eluate #1"
12. Repeated step 9 and 10 using 10 mL of the same elution buffer+50 mM NaOH. The fraction collected is referred to as "Eluate #2".
13. All the fractions were analyzed by SDS-PAGE gel electrophoresis.

Observations

Sample 41 Protein Binding and Release (FIG. 4A)
  Selectively binds near 97 kd and below 31 kd bands.
  There were relatively low to no protein bands detected in the "Washes #1 and #2", respectively (see lane #3 and lane #4, respectively), which implies that the binding was specific/strong.
  The bound proteins were eluted in 1M NaCl containing buffer.

Untreated RHA Protein Binding and Release (FIG. 3A)
  The near 97 kd and below 31 kd bands were not present in the flow through. However, no proteins were eluted in either Eluate #1 or Eluate #2.

Porous HS50: Protein Binding and Release (FIG. 4B)
  Selectively binds near 97 kd and below 31 kd bands.
  There were relatively low to no protein bands detected in the "Washes #1 and #2", respectively (see lane #3 and lane #4, respectively), which suggests that the binding was specific/strong.
  The bound proteins were eluted in 1M NaCl containing buffer.

Conclusion

The surface treated rice hull ash sample 41 has very similar binding and release characteristics to the positive control.

Example 10

Surface Treated Silica Filter Media for Protein Binding and Release (Ion Exchange)

Objective

To test the binding and release of protein using surface treated silica filter media. The experiment design is based on ion exchange. The protein solution is particulate free, derived from *Micrococcus luteus* fermentation.

Table 10 summarizes the samples designation and their surface treatments.

TABLE 10

| Sample Identification | Description |
| --- | --- |
| Sample 42 | $1^{st}$ step 3-aminopropyltrimethoxysilane and $2^{nd}$ step Glycidyltrimethylammonium chloride treatment |
| Sample 40 | $1^{st}$ step N-(2-aminoethyl)-3-aminopropyltrimethoxysilane and $2^{nd}$ step Glycidyltrimethylammonium chloride treatment |
| Sample 34 | N-(2-aminoethyl)-3-aminopropyltrimethoxysilane treated Celite 545 |
| Sample 29 | N-(2-aminoethyl)-3-aminopropyltrimethoxysilane treated Celpure P1000 (commercial diatomaceous earth) |
| AgriSilicas RHA | Untreated |
| Celite 512 | Untreated commercial diatomaceous earth (World Minerals) |

Procedure

Same as in Example 8 for all samples except sample 29, sample 30 and CelPure P100, which have the following variations:

The protein test solution was diluted by 10× (versus 25×).

Steps 4 and 5 were repeated and the wash fraction collected is referred to as "Wash #2".

Observations

Under the test conditions used, the amount of protein test solution was in excess. As a result, all the flow through fractions had similar protein band patterns compared to the feed test solution. No attempt was made to qualitatively describe the protein binding capability of each silica filter media sample tested. The following observations are based on the eluate fractions only.

Sample 42 (FIG. 5A)

Most of the bound proteins were eluted at 1M NaCl (lane #5).

Sample 40 (FIG. 5B)

Most of the bound proteins were eluted at 1M NaCl (lane #5).

Sample 34 (FIG. 5C)

No significant amount of protein was eluted at 1M NaCl.

Small amount of proteins were eluted subsequently using high pH.

Sample 29 (FIG. 5D)

Both eluate fractions contain proteins, and the compositions seem similar in these fractions (lane #5 for 1M NaCl eluate and lane #6 for high pH eluate).

Untreated AgriSilica RHA (FIG. 5B)

The eluted fractions contain proteins, especially at MW lower than 14.4 kd.

Celite 512 (FIG. 5C)

The fraction eluted at 1M contains proteins near 97 kd, near and below 55 kd and especially between 14.4 kd and 6 kd (lane #10).

Conclusion

Samples 40 and 42 (surface treated rice hull ash) and samples 29 and 34 (surface treated diatomaceous) demonstrate protein-binding capability over the corresponding untreated counterparts.

Example 11

Surface Treated Rice Hull Ash for Dynamic Protein Binding and Release (Ion Exchange)

Objective

To test the dynamic binding and release of protein using surface treated rice hull ash sample 9. The experiment design is based on ion exchange. The protein solution is particulate free, derived from *Micrococcus luteus* fermentation.

Procedure 1. 6 g of sample 9 was placed into a 50 mL conical tube.
2. 50 mL equilibration buffer (25 mM Tris-HCl pH 8.4) was added and the sample was mixed by inversion for 30 min.
3. The samples was centrifuged at 2500 g for 5 minutes and the supernatant was decanted.
4. 30 mL of equilibration buffer was added and the sample was mixed well by inversions.
5. The sample was poured into a gravity flow column.
6. The surface-treated rice hull ash was allowed to settle and pack to a 10 mL volume.
7. The pre-filter was placed onto the packed bed.
8. 20 ml of equilibration buffer was added.
9. 25 mL of protein test solution was added (prepared the same way as in Example 6)
10. Flow through fractions were collected in 15 mL conical tubes.
11. 30 mL of equilibration buffer was added, and the "wash" was collected in 15 ml conical tubes.
12. The following steps were used sequentially for election and collection of multiple elutes as shown in Table 11:
    a. 0.2M NaCl in equilibration buffer was added.
    b. 2M NaCl in equilibration buffer was added.
    c. 0.1M NaOH was added.
13. All the fractions were analyzed by SDS-PAGE gel electrophoresis.

Figure 6:
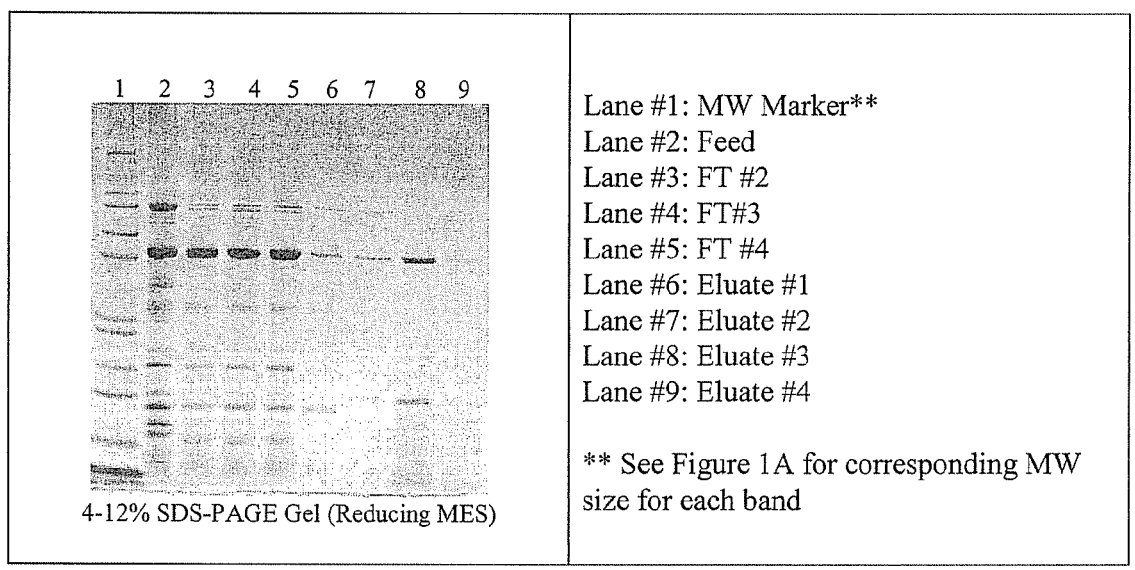
FIG. 6 shows dynamic protein binding and protein release using surface-treated RHA (sample 9).

Observations (FIG. 6)

The amount of solution loaded was higher than the capacity, hence significant breakthrough in the FT fractions (lanes 3, 4 and 5)

The surface treated rice hull ash, sample 9, had good flow property. All the steps performed above were easily accomplished by gravity flow.

FIG. 6 shows that at the at 10 mL load, the feed solution appears to breakthrough the 10 mL packed sample 9.

Under the binding conditions tested, sample 9 appears to selectively bind the near 96 kd, near 55 kd, the two bands below the 55 kd, bands near and between the 14.4 kd and 6 kd.

The following were observed with the three elution steps:
Three bands (near 97 kd, near 55 kd, and below 14.4 kd) were eluted at 0.2M.
At 2M NaCl, near 97 kd and near 55 kd bands were eluted.
Under 0.1M NaOH, near 55 kd, below 31 kd bands and near 14.4 kd proteins were eluted.

Table 11 shows a summary of fractions collected for the binding test.

TABLE 11

| Fraction | Volume (mL) |
| --- | --- |
| Feed | 25 mL loaded |
| FT#1 | 10.5 mL |
| FT#2 (after 10 mL feed was loaded) | 10 mL |
| FT#3 (after 14.5 mL was loaded) | 4.5 mL |
| FT#4 (after 25 mL feed was loaded) | 10 mL |
| Wash | 30 mL |
| Eluate #1 (0.2M NaCl) | 10 mL |
| Eluate #2 (2M NaCl) | 10 mL |
| Eluate #3 (1st 0.1M NaOH fraction, very dark) | 4.5 mL |
| Eluate #4 ($2^{nd}$ 0.1M NaOH) | 3.5 mL |

Conclusions

This example demonstrates that surface-treated rice hull ash can be used in a packed bed chromatography mode for protein binding and release and as a filter aid with gravity flow alone. The binding and release characteristics are similar to those of batch mode. The example also illustrates that selective elution can be achieved by using different elution buffers.

Example 12

Surface-Treated Rice Hull Ash for Simultaneous Particulate Capture and Soluble Capture/Release Objective To test the characteristics of surface-treated rice hull ash for simultaneous particulate filtration, and protein binding and release. The surface treated rice hull ash was designated sample 19, which was demonstrated to have anion exchange characteristics (see Example 8). The untreated rice hull ash was also tested in parallel.

Buffers

Equilibration Buffer: 25 mM Tris-HCl, pH 8.4.

Elution Buffer: 25 mM Tris-HCl, 1M NaCl, pH 8.4; 1M NaOH; 1M HCl

Test Solution

Flocculated *Micrococcus luteus* fermentation broth referred to as "feed" was prepared according to the following:
  After harvest, the broth was lyzed using 100 ppm lysozyme (chicken egg white).
  The lysed broth was flocculated using poly-cationic polymer.
  The flocculated sample was diluted with 1 part equilibration buffer before testing.

Procedure
1. Surface-treated rice hull ash preparation:
   5 g of untreated RHA was placed into each of the two 50 mL conical tubes.
   40 mL equilibration buffer was added and the tubes were mixed by inversion for 30 min.
2. The tubes were centrifuged at 2500×g for 5 minutes and decanted in step #1 for the untreated rice hull ash.
3. 50 mL of the prepared test solution "feed" was added to each prepared rice hull ash.
4. The tubes were mixed by inversion for 30 min at room temperature.
5. A 1 mL small sample was centrifuged using a bench top centrifuge (4 min) and the supernatant was collected (referred to as "Bench FT").
6. 0.45 μm 250 mL-Nalgen unit was prepared for filtration:
   The unit was connected to a house vacuum outlet.
   The other prepared rice hull ash was suspended in 50 mL of equilibration buffer.
   The suspension was poured into the filter unit, and (house) vacuum was applied to form a pre-coat (cake).
   The filtrate reservoir was emptied.
   The reservoir was reconnected for the filtration test.
7. The protein solution with rice hull ash ad-mix from step 4 was poured into the prepared filtration unit and vacuum was reapplied to start filtration. The collected filtrate sample is referred to as "FT Filtrate".
8. The vacuum was discontinued and 50 mL of Equilibration Buffer was added and mixed by stirring. The vacuum was reapplied to start filtration. The filtrate sample was collected and referred to as "Wash".
9. Step 8 was repeated with 50 mL of Elution Buffer and mixed for 15 min before vacuum was reapplied to start filtration. The filtrate sample was collected and is referred to as "Eluate".
10. All the fractions were analyzed by 4-12% Tris-Bis SDS-PAGE gel electrophoresis with MES running buffer (see separate Excel file for procedure).
11. Steps 1-10 were repeated with the untreated rice hull ash.

Observations/Comments
1. The surface-treated rice hull ash, sample 19, appears to have slightly thinner cake thickness than the untreated rice hull ash.
2. All the fractions collected (FT filtrate, wash and eluate) from both rice hull ashes were clear, free of particulate.
3. The surface-treated rice hull ash, sample 19, has a particulate filtration rate comparable to the filtration rate of the untreated rice hull ash:
   Sample 19: 12.8 mL/min
   Untreated RHA: 14.0 mL/min
4. Sample 19 demonstrates good capture and release over untreated RHA:
   Untreated RHA (FIG. 7A)
     The "FT filtrate" (lane #4) has very similar profile as the feed (lane #2). All the bands are slightly lighter than the feed, which is an artifact of dilution from the buffer used to condition the rice hull ash.
     The protein solution physically trapped within the rice hull ash was displaced and this is represented by the "wash" fraction (contains very faint protein bands, see lane #5)
     There was only trace amount of protein in the Eluate (lane #6).
5. Sample 19 (FIG. 7B)
   Demonstrates good binding and recovery of the bound protein.
   The "FT filtrate" fraction has very low to no protein (lane #4). The "Bench FT" supernatant (lane #3) has slight protein bands when compare to the "FT Filtrate", which indicates that proteins were captured as they passed through the cake.
   The wash has low to no protein bands (lane #5).
   The Eluate has similar band patterns but slightly less intense than the feed (lane #6).

Conclusion

The surface-treated rice hull ash simultaneously captured soluble proteins of interest by ion exchange and separated particulates from the feed protein solution. The captured proteins can be subsequently extracted from the surface treated rice hull ash by elution with a high-salt buffer.

The results demonstrate that surface-treated rice hull ash can be used to separate a particulate-containing protein solution into three streams:

particulates trapped in surface-treated rice hull ash pre-coat and body feed, non-protein components bound to surface treated rice hull ash, and protein components bound to and eluted off the surface treated rice hull ash.

Example 13

Surface Treated Rice Hull Ash for Simultaneous Particulate Capture and Soluble Capture/Release Objective To repeat Example 12 using a Aspergillus niger broth using the same surface-treated rice hull ash (sample 19) and untreated rice hull ash.

Test Solution

Aspergillus niger fermentation was diluted with 4 parts of DI water and pH was adjusted to 8.06 using NaOH.

Procedure

Same as in the Example 12. Test solution volume was 100 mL.

Observations/Comments

The surface treated rice hull ash, sample 19, has a comparable particulate filtration rate to the untreated rice hull ash.

All the fractions collected (FT filtrate, wash and eluate) from both rice hull ashes were clear, free of particulate.

Figure 8:
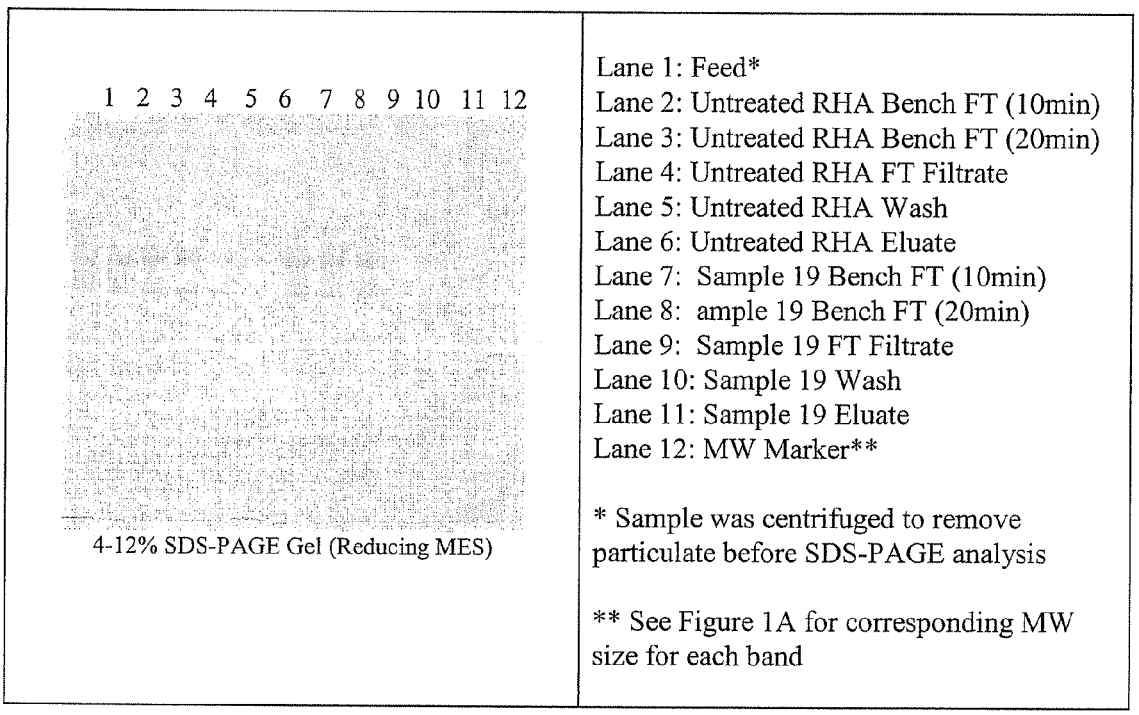
FIG. 8 shows silica filter media sample 19 and untreated RHA for simultaneous particulate filtration and soluble capture release.

Under the conditions tested, the amount of test solution used was in excess of the binding capacity. As a result, the flow through fractions (both "bench FT" and "Filtrate FT") for both sample 19 and untreated RHA were not significantly different from the feed solution. See FIG. 8, lanes #2, 3 and 4 versus lane #1 for untreated RHA and lanes #7, 8 and 9 versus lane #1 for sample 19.

The following observations confirmed that sample 19 has protein-binding capability over the untreated RHA (see FIG. 8):

Untreated RHA Wash (lane #5) contains more protein than the sample 19 (lane #10).

The eluted fraction from sample 19 (lane #11) shows higher protein band intensity than the eluted fraction from untreated RHA (lane #6).

Conclusion

This example demonstrates that the surface-treated rice hull ash simultaneously captured soluble proteins of interest by ion exchange and separated particulates from the Aspergillus niger derived feed protein solution. The captured proteins can be subsequently extracted from the surface treated rice hull ash by elution with high salt buffer.

The results demonstrate that surface-treated rice hull ash can be used to separate a particulate containing protein solution into three streams:

particulates trapped in surface treated rice hull ash pre-coat and body feed, non-protein components bound to surface treated rice hull ash, and protein components bound to and eluted off the surface treated rice hull ash.

Example 14

Protein Binding Test

Materials

MilliQ $H_2O$

Protein solution (filtered catalase DFC)

50 mL Oak Ridge tubes

Sorval RC 5B Plus centrifuge with Sorval SA600 rotor

BCA Protein assay kit (Pierce)

Compat-Able Protein Assay Preparation Reagent Set (Pierce)

Pre-Diluted Protein Assay Standards, bovine serum albumin fraction V set (Pierce)

5 μm syringe filter (Sartoris, Minisart, #17594)

Procedures 1. 1 g of each silane treated rice hull ash Sample #54-67 was added into a 50 mL Oak Ridge tube.
2. 20 mL MilliQ $H_2O$ was added to each tube.
3. The contents of each tube was mixed by turning end-over-end at 8 rpm for 10 minutes at room temperature.
4. Each tube was centrifuged at 16,000 rpm, 15° C. for 15 minutes.
5. The supernatant was carefully removed using plastic transfer pipettes.
6. 1 part protein solution was diluted with 24 parts MilliQ $H_2O$ (Feed).
7. 10 mL Feed was added to each tube (gave 10% w/v solid).
8. Each tube was incubated at room temperature for 2 hours, turning end-over-end at 8 rpm.
9. Each tube was centrifuged at 16,000 rpm, 15° C. for 30 minutes.
10. Each supernatant was filtered through a 0.45 μm syringe filters.
11. The protein concentrations of Feed and filtered supernatants (Step 10) were measured by BCA assay using microtiterplate protocol. The results are shown as Table 12.

TABLE 12

| Sample # | Silane Type | Protein concentration ug/ml Original 160.66 |
|---|---|---|
|  | Untreated RHA | 98.75 |
| 54 | trimethoxysilylpropyl-ethylenediamine, triacetic acid, trisodium salt | 120.09 |
| 55 | N-(triethoxysilylpropyl)-O-polyethylene oxide urethane | 136.10 |
| 56 | Bis-(2-hydroxyethyl)-3-aminopropyltriethoxysilane | 112.02 |
| 57 | ((chloromethyl)phenylethyl)trimethoxysilane | 103.21 |
| 58 | N-(3-triethoxysilylpropyl)-gluconamide | 81.02 |
| 59 | 3-mercaptopropyltriethoxysilane | 73.43 |
| 60 | N-(triethoxysilylpropyl)-4-hydroxybutyramide | 98.83 |
| 61 | 3-(triethoxysilyl)propylsuccinic anhydride | 73.49 |
| 62 | Tris(3-trimethoxysilylpropyl)isocyanurate | 81.41 |
| 63 | 2-Hydroxy-4-(3-triethoxysilylpropoxy)-diphenylketone | 49.57 |
| 64 | Ureidopropyltrimethoxysilane | 100.04 |
| 65 | 3-isocyanatopropyltriethoxysilane | 76.12 |
| 66 | N-(3-trimethoxysilylpropyl)pyrrole | 59.32 |
| 67 | Bis[(3-methyldimethoxysilyl)propyl]-polypropylene oxide | 110.24 |

Results

The protein concentrations of the Feed materials were decreased after the Feed materials were mixed with sample numbers 54-67, centrifuged, and filtered. The results indicate that silane-treated silica sample numbers 54-67 and untreated RHA all bound proteins from the Feed protein solution.

Example 15

Test of Antimicrobial Activity (*Bacillus subtilis*)

Microorganism tested: *Bacillus subtilis*

Filter media tested: filter media samples 43, 44, 4 and FW12 (untreated diatomaceous earth)

Protocol:
  *Bacillius subtilis* fermentation broth was diluted in sterile PBS to ~$10^4$ CFU/mL (1 OD≈$5*10^8$ CFU/mL was used to estimate CFU/mL in fermentation broth)
  Use 0.5 g filter media/5 mL liquid (10% solid)
1. Serial dilutions (made in sterile 0.9% w/v NaCl) of the diluted broth sample were plated on LA plates to determine actual CFU/mL used. Plates were incubated over night at 34° C.
2. Filter media and diluted bacterial sample (or PBS control) were mixed in a sterile 125 mL baffled flask for 2½ hours at 30° C., 200 rpm.
3. Liquid part of the treated samples (2) were plated on LA plates (5 plates for each sample, one plate for control) and incubated overnight at 34° C.
4. The plates were counted for bacteria.

Results:

The results are summarized in Table 13. By mixing the bacteria with filter media samples 4 and 44, the CFUs were reduced, which indicates that filter media samples 4 and 44 had anti-microbial activity and killed the bacteria by contacting.

TABLE 13

| Sample | CFU/mL |
|---|---|
| Diluted broth - start | $6.53 * 10^3 \pm 2.47 * 10^3$ |
| Sample 43 + bacteria - mixing | $1.04 * 10^4 \pm 1.50 * 10^3$ |

TABLE 13-continued

| Sample | CFU/mL |
|---|---|
| Sample 44 + bacteria - mixing | $1.30 * 10^2 \pm 3.00 * 10^1$ |
| Sample 4 + bacteria - mixing | TFTC |
| FW12 + bacteria - mixing | $5.90 * 10^4 \pm 8.00 * 10^3$ |
| Diluted broth sample - mixing | $1.05 * 10^3 \pm 5.00 * 10^1$ |

Notes and Abbreviations:
  PBS: Phosphate buffered saline (prevents cells from lysing due to osmotic chock)
  CFU: colony forming units (a measure of viable cells)
  TFTC: Too Few To Count
  The CFU/mL are reported as: Average±Difference (number of plates) [the difference is between the average and the observations farthest from the average].
  Only plates with between 20-300 colonies were counted.

Example 16

Test of Antimicrobial Activity (*Bacillus subtilis*)

Microorganism tested: *Bacillus subtilis*

Filter Media tested: filter media samples 1, 4, 6, 44, and 45.

Protocol:
  *Bacillus subtilis* fermentation broth was diluted in sterile PBS to ~$10^4$ CFU/mL.
  0.5 g filter media/5 mL liquid (10% solid) was used.
1. Serial dilutions (made in sterile 0.9% w/v NaCl) of the diluted broth sample were plated on LA plates to determine actual CFU/mL used. Plates were incubated over night at 34° C.
2. Filter media and diluted bacterial sample (15 mL liquid) were mixed in a sterile 250 mL baffled flask. 2 flasks were used for each filter media.
  (A flask with PBS instead of bacterial sample was included for the following filter media: Samples 1, 6 and 45)
3. The above was mixed for 2 hours at 30° C., 250 rpm.
4. Treated samples (the liquid part) were plated on LA plates (4 or 5 plates for each sample). Plates were incubated overnight at 34° C.
5. The plates were counted for bacteria.

Results:

The results are summarized in Table 14. By mixing the bacteria with filter media samples 1, 4, 6, 44, and 45, the CFUs were significantly reduced.

TABLE 14

| Sample | | CFU/mL |
|---|---|---|
| Diluted broth - start | | $3.45 * 10^4 \pm 4.50 * 10^3$ |
| Diluted broth - mixing | | $1.72 * 10^4 \pm 1.55 * 10^3$ |
| Sample 1 | A | TFTC |
| | B | TFTC |
| Sample 4 | A | TFTC |
| | B | TFTC |
| Sample 6 | A | TFTC |
| | B | $1.00 * 10^2 \pm 0.00 * 10^0$ |
| Sample 44 | A | $3.10 * 10^2 \pm 9.00 * 10^1$ |
| | B | $6.00 * 10^2$ |
| Sample 45 | A | TFTC |
| | B | TFTC |

Example 17

Test of Antimicrobial Activity and Filtration
(*Lactobacillus brevis*)

Microorganism tested: *Lactobacillus brevis*

Filter media tested: Samples 4, 43, 45 & FW12.

Used 0.5 g filter media/5 mL culture (10% solid).

Protocol:
1. A *Lactobacillus brevis* overnight culture was diluted to ~$10^5$ CFU/mL (based on 1 $OD_{600} \approx 2.7 * 10_8$ CFU/mL) in two steps—the first dilution was made in sterile *Lactobacillus* MRS broth, the second in sterile PBS.
2. Serial dilutions (in 0.9% w/v NaCl) of the culture were made (second dilution).
3. Diluted samples were plated on *Lactobacillus* MRS broth plates, to determine actual starting CFU/mL.
4. Filter media and diluted bacterial sample (10 mL liquid) were mixed in a sterile 125 mL baffled flask, sealed with PARAFILM®, for 2 hours 15 minutes at room temperature on an orbit shaker (~60 rpm).
5. Serial dilutions (in 0.9% w/v NaCl) were made of treated sample and plated on *Lactobacillus* MRS broth plates.
6. Selected samples/dilutions of samples 4, 43 and 45 were filtered through a 5 µm filter.
7. The filtered samples were plated on *Lactobacillus brevis* broth plates, and incubated in a candle jar at 30° C. for 2 days.
8. The plates were counted.

Results:

The results are summarized in Table 15. CFUs were reduced by mixing Samples 4, 43, and 45 with bacteria. CFUs were further reduced by filtering the mixture through a 5 µm filter.

TABLE 15

| Sample | CFU/mL |
|---|---|
| *Lactobacillus brevis* culture - start | $1.05 * 10^5 \pm 2.50 * 10^3$ |
| *Lactobacillus brevis* culture - mixing | $1.23 * 10^5 \pm 2.50 * 10^3$ |
| Sample 4 (mixing) | $3.22 * 10^4 \pm 4.77 * 10^3$ |
| Sample 43 (mixing) | $3.43 * 10^4 \pm 5.67 * 10^3$ |
| Sample 45 (mixing) | $5.55 * 10^2 \pm 4.50 * 10^1$ |
| FW12 (DE) | $8.60 * 10^4 \pm 4.75 * 10^3$ |

TABLE 15-continued

| Sample | CFU/mL |
|---|---|
| Filtered Sample 4 | TFTC |
| Filtered Sample 43 | TFTC |
| Filtered Sample 45 | TFTC |

Example 18

Test of Antimicrobial Activity (*E. coli*)

Microorganism tested: *E. coli* (MG1655)

Filter media tested: FW12, samples 43, 1, 4, 6, 44 and 45.

Protocol:

0.5 g Filter Media/5 mL Feed (=10% solid).
1. An *E. coli* culture (not yet in stationary phase) was diluted to ~$10^5$ CFU/mL (based on 1 $OD_{600} \approx 5 * 10^8$ CFU/mL) in two steps—the first dilution was made in sterile LB media, the second in sterile PBS (this was the Feed).
2. Serial dilutions (in 0.9% w/v NaCl) of the Feed were made.
3. 100 µL of the diluted feed samples were plated on LA plates, to determine the actual starting CFU/mL.
4. Filter media and 10 mL feed were mixed in a sterile 125 mL baffled flask for 2 hours at 25° C., 200 rpm (¾ inch stroke).
5. Serial dilutions (in 0.9% w/v NaCl) of mixed samples were made and 100 µl of each was plated on LA plates, and incubated overnight at 30° C.
6. Plates were counted.

Results:

The results are summarized in Table 16.

TABLE 16

| Sample | CFU/mL |
|---|---|
| MG1655 - start | $6.80 * 10^4 \pm 4.00 * 10^3$ |
| MG1655 - mixing | $5.35 * 10^5 \pm 2.50 * 10^4$ |
| diatomaceous earth | $2.28 * 10^5 \pm 1.72 * 10^5$ |
| Sample 43 | $9.05 * 10^3 \pm 5.50 * 10^2$ |
| Sample 1 | $1.28 * 10^3 \pm 2.45 * 10^2$ |
| Sample 4 | $1.73 * 10^4 \pm 2.03 * 10^3$ |
| Sample 6 | TFTC |
| Sample 44 | $2.70 * 10^3 \pm 1.23 * 10^2$ |
| Sample 45 | $5.20 * 10^3 \pm 2.00 * 10^2$ |

Example 19

Test of Antimicrobial Activity and Filtration
(*Lactobacillus brevis*)

Microorganism tested: *Lactobacillus brevis* type strain (ATCC#14869)

Filter media tested: Samples 43, 4, and 44

Protocol:

0.5 g Filter media/5 mL Feed (=10% solid)
1. A *Lactobacillus brevis* culture was diluted to ~$10^5$ CFU/mL (based on 1 $OD_{600} \approx 2.7 * 10^8$ CFU/mL) in two steps—the first dilution was made in sterile *Lactobacillus* MRS broth, the second in sterile PBS (this was the Feed).
2. Serial dilutions (in 0.9% w/v NaCl) of the Feed were made.
3. 100 µL of the diluted samples were plated on *Lactobacillus* MRS broth plates, to determine the actual starting CFU/mL.

4. Filter media and 5 mL Feed were mixed in a sterile 15 mL conical tube for 2 hours at 25° C., 250 rpm (½ inch stroke).
5. Serial dilutions (in 0.9% w/v NaCl) of mixed samples were made and plated on *Lactobacillus* MRS broth plates (100 μl each).
6. All samples were filtered through 5 μm syringe filter.
7. Serial dilutions (in 0.9% w/v NaCl) of filtered samples were made and plated on *Lactobacillus* MRS broth plates.
8. Plates were counted in a candle jar at 30° C. for 2 days.
9. Plates were counted.

Results:

The results are summarized in Table 17. CFUs were reduced by mixing Samples 4, 43, and 44 with bacteria. CFUs were further reduced by filtering the mixture through a 5 μm filter.

TABLE 17

| Sample | CFU/mL | CFU/mL (filtered) |
|---|---|---|
| ATCC#14869 - start | $2.83 * 10^4 \pm 4.67 * 10^3$ | |
| ATCC#14869 - mixing | $4.00 * 10^4 \pm 2.00 * 10^3$ | $1.27 * 10^4 \pm 5.80 * 10^2$ |
| Sample 43 | $4.55 * 10^3 \pm 3.50 * 10^2$ | $2.40 * 10^3 \pm 2.00 * 10^2$ |
| Sample 4 | $1.95 * 10^2 \pm 5.00 * 10^0$ | TFTC |
| Sample 44 | $8.10 * 10^2 \pm 1.40 * 10^2$ | $5.50 * 10^1 \pm 5.00 * 10^0$ |

Example 20

Test of Antimicrobial Activity (*Lactobacillus brevis*)

Microorganism tested: *Lactobacillus brevis*

Filter media tested: Samples 48, 50, 51, and 52.

Protocol:
1. *Lactobacillus brevis* (gram positive) culture was streaked on MRS agar and incubated anaerobically at 26° C. until growth was sufficient.
2. Working inoculum was prepared by diluting colonies from the MRS plates into 0.1% peptone, targeting 5×104 cfu/mL.
3. 0.5 g filter media was added to 10 mL inoculum in a 30 mL glass tube (5%).
4. The glass tube was sealed and incubated at room temperature for 30 minutes with mixing (8 inversions/minute).
5. Serial dilutions of 1:10 were prepared in 0.9% NaCl and plated with MRS agar, using the pour plate method to enumerate bacterial population.
6. Plates were incubated at 26° C., anaerobically (GasPak), until growth was sufficient to count.
7. Plates that had 20-200 colonies were counted. The Results are summarized in Table 18.

Example 21

Test of Antimicrobial Activity (*Acetobacter pasteurianus* (Gram Negative))

Microorganism tested: *Acetobacter pasteurianus* (gram negative)

Filter media tested: Samples 48, 50, 51, and 52.

Protocol:
1. *Acetobacter pasteurianus* (gram negative) culture was streaked onto MRS agar and incubated aerobically at 27° C. until growth was sufficient.
2. Culture was stocked by adding 1 mL loop of agar plate colonies to 99 mL of MRS broth and incubated at 27° C.
3. Working inoculum was made by diluting an aliquot of the MRS stock culture into either phosphate buffered saline (PBS) or 0.1% peptone.
4. 0.5 g of filter media was added to 10 mL inoculum in a 30 mL glass tube.
5. The glass tube was sealed and incubated at room temperature for 30 minutes with mixing (8 inversions/minute).
6. Serial dilutions of 1:10 were performed in 0.1% peptone and plated with MRS agar, using the pour plate method to enumerate bacterial population.
7. Plates were counted at 27° C., aerobically, until growth was sufficient to count.
8. Plates that had 20-200 colonies were counted. The Results are summarized in Table 18.

Example 22

Test of Antimicrobial Activity (*Saccharomyces diastaticus* (Yeast))

Microorganism tested: *Saccharomyces diastaticus* (yeast)

Filter media tested: Samples 48, 50, and 51.

Protocol:
1. *Saccharomyces diastaticus* (yeast) culture was streaked onto YM agar and incubated aerobically at 30° C. until growth was sufficient.
2. Working inoculum was prepared by diluting colonies from the YM plates into phosphate buffered saline (PBS), targeting 3×104 cfu/mL.
3. 0.5 g to filter media was added to 10 mL inoculum in a 30 mL glass tube.
4. The glass tube was sealed and incubated at room temperature for 30 minutes with mixing (8 inversions/minute).
5. Serial dilutions of 1:10 were performed in 0.9% NaCl and plated with MRS agar, using the pour plate method to enumerate bacterial population.
6. Plates were incubated at 30° C., aerobically, until growth was sufficient to count.
7. Plates that had 20-200 colonies were counted. The Results are summarized in Table 18.

TABLE 18

| Sample No. | Treatment | Silica Type | *Lactobacillus Brevis*, grams positive (+) % Reduction | *Acetobacter pasteurinus*, gram negative (−) % Reduction | *Saccharomyces distaticus*, yeast % Reduction |
|---|---|---|---|---|---|
| 48 | 3-(N-styrylmethyl-2-aminoethylamino)-propyltrimethoxy-silane hydrochloride | RiceSil 100 | 100% | 18% | 41% |

TABLE 18-continued

| Sample No. | Treatment | Silica Type | Lactobacillus Brevis, grams positive (+) % Reduction | Acetobacter pasteurinus, gram negative (−) % Reduction | Saccharomyces distaticus, yeast % Reduction |
|---|---|---|---|---|---|
| 51 | 3-trihydroxysilylpropyl-methyl phosphonate, sodium salt | RiceSil 100 | 20% | 10% | 33% |
| 50 | N-(2-Aminoethyl)-3-aminopropyltrimethoxy-silane Glycidyltrimethyl-ammonium chloride | RiceSil 100 | 90% | 20% | 3% |
| 52 | N-Octadecyldimethyl(3-Trimethoxysilylpropyl) ammonium chloride | RiceSil 100 | 100% | 90% | |

Although the invention has been described with reference to the presently preferred embodiments, it should be understood that various modifications could be made without departing from the scope of the invention.

What is claimed is:

1. Silane-treated silica filter media prepared by reacting the surface active group of silica filter media with silanes selected from the group consisting of 3-aminopropyltrimethoxysilane and N-(triethoxysilylpropyl)-O-polyethylene oxide urethane; 3-trihydrosilylpropylmethylphosphonate, sodium salt and N-(triethoxysilylpropyl)-O-polyethylene oxide urethane; N-trimethoxysilylpropyl-N,N,N-trimethylammonium chloride and (3-glycidoxypropyl)trimethoxysilane; 3-trihydrosilylpropylmethylphosphonate, sodium salt and bis-(2-hydroxyethyl)-3-aminopropyltriethoxysilane; 3-(N-styrylmethyl-2-aminoethylamino)-propyltrimethoxysilane hydrochloride and N-(triethoxysilylpropyl)-O-polyethylene oxide urethane; 2-(trimethoxysilylethyl)pyridine and N-(3-triethoxysilylpropyl)-gluconamide; N-trimethoxysilylpropyl-N,N,N-trimethylammonium chloride and N-(3-triethoxysilylpropyl)-gluconamide; N-trimethoxysilylpropyl-N,N,N-trimethylammonium chloride and 2-hydroxy-4-(3-triethoxysilylpropoxy)-diphenylketone; 3-mercaptopropyltriethoxysilane and N-(triethoxysilylpropyl)-O-polyethylene oxide urethane; 3-(triethoxysilyl)propylsuccinic anhydride and N-(triethoxysilylpropyl)-O-polyethylene oxide urethane; trimethoxysilylpropyl-ethylenediamine, triacetic acid, trisodium salt and N-(triethoxysilylpropyl)-O-polyethylene oxide urethane; 2-(4-chlorosulfonylphenyl)-ethyltrichlorosilane and N-(triethoxysilylpropyl)-O-polyethylene oxide urethane; and 2-(4-chlorosulfonylphenyl)-ethyltrichlorosilane and bis-(2-hydroxyethyl)-3-aminopropyltriethoxysilane, wherein the silica filter media are rice hull ash, oat hull ash or diamataceous earth.

2. The silane-treated silica filter media according to claim 1, wherein said silanes are 3-aminopropyltrimethoxysilane and N-(triethoxysilylpropyl)-O-polyethylene oxide urethane.

3. The silane-treated silica filter media according to claim 1, wherein said silanes are 3-(N-styrylmethyl-2-aminoethylamino)-propyltrimethoxysilane hydrochloride and N-(triethoxysilylpropyl)-O-polyethylene oxide urethane.

4. Silane-treated silica filter media prepared by reacting the surface active group of silica filter media with one or more silanes selected from the group consisting of 2-hydroxy-4-(3-triethoxysilylpropoxy)-diphenlyketone, 2-(trimethoxysilylethyl)pyridine, N-(triethoxysilylpropyl)-O-polyethylene oxide urethane, 3-(trimethoxysilyl)propyl methacrylate, 3-(triethoxysilyl)propylsuccinic anhydride, tris(3-trimethoxysilylpropyl)isocyanurate, bis[(3-methyldimethoxysilyl)propyl]-polypropylene oxide, 2-(3,4-epoxycyclohexyl)ethyltrimethoxysilane, N-(3-triethoxysilylpropyl)-4,5-dihydroimidazole, 2-(4-chlorosulfonylphenyl)-ethyltrichlorosilane, trimethoxysilylpropylisothiouronium chloride, N-(3-triethoxysilylpropyl)-gluconamide, N-(triethoxysilylpropyl)-4-hydroxy butyramide, and O-(propargyloxy)-N-(triethoxysilylpropyl)urethane, wherein the silica filter media are rice hull ash, oat hull ash, or diamotaceous earth.

5. The silane-treated silica filter media according to claim 4, wherein said silane is 2-hydroxy-4-(3-triethoxysilylpropoxy)-diphenylketone.

6. The silane-treated silica filter media according to claim 4, wherein said silane is N-(triethoxysilylpropyl)-O-polyethylene oxide urethane.

7. The silane-treated silica filter media according to claim 4, wherein said silane is 3-(triethoxysilyl)propylsuccinic anhydride.

8. The silane-treated silica filter media according to claim 4, wherein said silane is tris(3-trimethoxysilylpropyl)isocyanurate.

9. The silane-treated silica filter media according to claim 4, wherein said silane is bis[(3-methyldimethoxysilyl)propyl]-polypropylene oxide.

10. The silane-treated silica filter media according to claim 4, wherein said silane is N-(3-triethoxysilylpropyl)-gluconamide.

11. The silane-treated silica filter media according to claim 4, wherein said silane is N-(triethoxysilylpropyl)-4-hydroxybutyramide.

12. The silane-treated silica filter media according to claim 4, wherein said silane is 2-(trimethoxysilylethyl)pyridine.

13. The silane-treated silica filter media according to claim 4, wherein said silane is 3-(trimethoxysilyl)propyl methacrylate.

14. The silane-treated silica filter media according to claim 4, wherein said silane is 2-(3,4-epoxycyclohexyl)ethyltrimethoxysilane.

15. The silane-treated silica filter media according to claim 5, wherein said silane is N-(3-triethoxysilylpropyl)-4,5-dihydroimidazole.

16. The silane-treated silica filter media according to claim 4, wherein said silane is 2-(4-chlorosulfonylphenyl)-ethyltrichlorosilane.

17. The silane-treated silica filler media according to claim 4, wherein said silane is trimethoxysilylpropylisothiouronium chloride.

18. The silane-treated silica filter media according to claim 4, wherein said silane is O-(propargyloxy)-N-(triethoxysilylpropyl)urethane.

* * * * *